US011745821B2

(12) United States Patent
Toyota et al.

(10) Patent No.: US 11,745,821 B2
(45) Date of Patent: Sep. 5, 2023

(54) STRADDLED VEHICLE HAVING HANDLEBAR

(71) Applicant: YAMAHA HATSUDOKI KABUSHIKI KAISHA, Iwata (JP)

(72) Inventors: Takeshi Toyota, Iwata (JP); Nobuo Hara, Iwata (JP); Yukihide Fukuhara, Iwata (JP); Tatsuya Nagata, Iwata (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 1072 days.

(21) Appl. No.: 16/195,119

(22) Filed: Nov. 19, 2018

(65) Prior Publication Data

US 2019/0084639 A1 Mar. 21, 2019

Related U.S. Application Data

(63) Continuation-in-part of application No. PCT/JP2017/018869, filed on May 19, 2017.

(30) Foreign Application Priority Data

May 19, 2016 (JP) .................. 2016-100836

(51) Int. Cl.
  *B62K 21/00* (2006.01)
  *B62D 5/04* (2006.01)
  *B62K 21/12* (2006.01)
  *B62K 21/26* (2006.01)
(52) U.S. Cl.
  CPC ............... *B62K 21/00* (2013.01); *B62D 5/04* (2013.01); *B62K 21/12* (2013.01); *B62K 21/26* (2013.01)

(58) Field of Classification Search
  CPC .......... B62K 21/00; B62K 21/12; B62D 5/04; B62D 5/0457; B62D 6/02
  See application file for complete search history.

(56) References Cited

U.S. PATENT DOCUMENTS

| | | | | |
|---|---|---|---|---|
| 4,499,964 A | * | 2/1985 | Abe ..................... | B62D 6/02 180/422 |
| 4,538,698 A | * | 9/1985 | Hashimoto ............ | B62D 5/046 180/446 |
| 4,549,628 A | * | 10/1985 | Abe ..................... | B62D 6/02 180/421 |

(Continued)

FOREIGN PATENT DOCUMENTS

| | | |
|---|---|---|
| CN | 203111409 U | 8/2013 |
| EP | 1093992 A2 | 4/2001 |

(Continued)

*Primary Examiner* — Tony H Winner
*Assistant Examiner* — Maurice L Williams
(74) *Attorney, Agent, or Firm* — Rabin & Berdo, P.C.

(57) ABSTRACT

A straddled vehicle includes a vehicle body frame, a steering shaft supported by the vehicle body frame, a handlebar that includes a left grip and a right grip and is connected to the steering shaft, a steering wheel, and a steering assist device that applies assist force in a same direction as that of a steering torque that has been input to the handlebar by a rider to the steering shaft. The steering assist device causes the assist force to decrease as speed of the vehicle increases in a first vehicle speed zone and causes the assist force to increase as the speed of the vehicle increases in a second vehicle speed zone that is higher than the first vehicle speed zone.

8 Claims, 14 Drawing Sheets

(56) References Cited

U.S. PATENT DOCUMENTS

| | | | | |
|---|---|---|---|---|
| 4,600,071 A * | 7/1986 | Kitahara | F02B 67/04 | 180/441 |
| 4,640,148 A * | 2/1987 | Hasegawa | B62D 3/123 | 74/422 |
| 4,650,213 A * | 3/1987 | Fujita | B62D 9/02 | 280/93.51 |
| 4,651,840 A * | 3/1987 | Shimizu | B62D 6/02 | 180/446 |
| 4,759,419 A * | 7/1988 | Nagae | B62D 6/02 | 180/422 |
| 5,327,986 A * | 7/1994 | Saita | B62D 5/04 | 180/446 |
| 5,487,007 A * | 1/1996 | Suzuki | B62D 6/00 | 180/422 |
| 5,992,558 A * | 11/1999 | Noro | B62D 6/007 | 180/446 |
| 9,533,705 B2 * | 1/2017 | Tamura | B62D 6/00 | |
| 2003/0141138 A1 * | 7/2003 | Shimizu | B62D 6/02 | 180/422 |
| 2007/0007071 A1 * | 1/2007 | Aime | B62K 5/01 | 180/444 |
| 2007/0102217 A1 * | 5/2007 | Kimura | B62K 25/005 | 180/223 |
| 2009/0125187 A1 * | 5/2009 | Yamamoto | B62D 5/049 | 701/42 |
| 2009/0139793 A1 | 6/2009 | Suzuki | | |
| 2009/0194362 A1 * | 8/2009 | Hikichi | B62K 21/00 | 180/443 |
| 2010/0042295 A1 * | 2/2010 | Shibata | B62D 5/008 | 701/41 |
| 2011/0035113 A1 * | 2/2011 | Yanagi | B60G 7/006 | 701/42 |
| 2012/0046806 A1 * | 2/2012 | Yokota | B62D 5/0457 | 701/1 |
| 2013/0110352 A1 * | 5/2013 | Doi | B62D 1/16 | 701/42 |
| 2014/0343789 A1 * | 11/2014 | Maeda | B62D 5/0463 | 701/41 |
| 2015/0210310 A1 * | 7/2015 | Akatsuka | B62D 5/0463 | 701/41 |
| 2015/0360717 A1 * | 12/2015 | Kim | B62D 5/065 | 701/41 |
| 2016/0001811 A1 * | 1/2016 | Endo | B62D 5/0463 | 701/41 |
| 2016/0075370 A1 * | 3/2016 | Itamoto | B62D 5/0493 | 701/41 |
| 2016/0272237 A1 * | 9/2016 | Kawamura | B62D 5/04 | |
| 2017/0151979 A1 * | 6/2017 | Maeda | B62D 5/0484 | |
| 2017/0166246 A1 * | 6/2017 | Gotou | B62D 6/02 | |
| 2017/0203782 A1 * | 7/2017 | Yamanaka | B62D 5/04 | |
| 2017/0217477 A1 * | 8/2017 | Akatsuka | B62D 5/0463 | |
| 2017/0274929 A1 * | 9/2017 | Sasaki | B62D 5/0487 | |
| 2018/0009467 A1 * | 1/2018 | Lim | B62D 6/08 | |
| 2018/0273086 A1 * | 9/2018 | Jung | B62D 5/0466 | |
| 2018/0281878 A1 * | 10/2018 | Aoki | B62D 55/116 | |

FOREIGN PATENT DOCUMENTS

| | | |
|---|---|---|
| EP | 2436586 A1 | 4/2012 |
| GB | 2494496 A | 3/2013 |
| JP | 2009-083578 A | 4/2009 |
| JP | 2009-132271 A | 6/2009 |
| JP | 2011-073624 A | 4/2011 |
| JP | 2012-076490 A | 4/2012 |
| JP | 5405969 B2 | 2/2014 |
| JP | 5475603 B2 | 4/2014 |

* cited by examiner

STRADDLED VEHICLE HAVING HANDLEBAR

CROSS-REFERENCES TO RELATED APPLICATIONS

The present application is a continuation-in-part application of International Application No. PCT/JP2017/018869, filed on May 19, 2017, and having the benefit of the earlier filing date of Japanese Application No. 2016-100836, filed May 19, 2016. The content of each of the identified applications is incorporated herein by reference in its entirety.

BACKGROUND

Technical Field

The present teaching relates to a straddled vehicle including a steering assist device that assists steering of a handlebar.

Background Art

Conventionally, a motorcycle including a steering assist device has been proposed. For example, in Japanese Patent No. 5405969 (Patent Document 1) below, it is described that, in a steering device of a motorcycle, a power assist unit that gives assist steering force by a motor is provided. The motor is controlled by vehicle speed and an input torque that is input to a handle. Also, the steering device includes a steering ratio variable unit that arbitrarily changes a steering ratio that is a ratio between a rotation angle of the handle and a steering angle of a front wheel. With this structure, an optimal steering ratio can be achieved in a whole speed zone from a low-speed zone up to a high-speed zone.

Also, in Japanese Patent No. 5475603 (Patent Document 2), a straddled vehicle including a motor that gives assist force to operation force that is applied to a handle and a vehicle speed sensor is disclosed. In the straddled vehicle, when the vehicle speed sensor detects a state in which vehicle speed is around zero, the assist force that is given by the motor is set to a predetermined intermediate value between a maximum value and a minimum value. Thus, in a state in which the vehicle speed is around zero, the assist force to handle operation force of a driver is not excessive.

CITATION LIST

Patent Document

Patent Document 1: Japanese Patent No. 5405969
Patent Document 2: Japanese Patent No. 5475603

SUMMARY OF INVENTION

It is an object of the present teaching to provide a straddled vehicle including a handlebar with which a different steering characteristic from that of a conventional straddled vehicle can be achieved.

Advantageous Effects of Invention

The inventors considered handlebar steering assist devices in straddled vehicles. First, the inventors carefully observed steering of a rider and a behavior of a vehicle and examined a steering characteristic required for a straddled vehicle. Each of a handlebar and a steering wheel of a straddled vehicle swings around an axis that extends in an up-down direction with the axis centered. Swinging ranges of the handlebar and the steering wheel are narrow. Also, a steering ratio that is a ratio between a rotation angle of the handlebar and a steering angle of the steering wheel is close to 1.

Also, in a straddled vehicle including a handlebar, at the time of turning in a low speed zone, as compared to turning in a high-speed zone, a magnitude of a steering torque that is input by a rider and a steering angle are large. Therefore, in turning in the low speed zone, as compared to turning in the high-speed zone, large steering assist force is required. In contrast, at the time of turning in the high-speed zone, as compared to turning in the low speed zone, the magnitude of the steering torque that is input by the rider and the steering angle are small. Therefore, in turning in the high-speed zone, as compared to turning in the low speed zone, small steering assist force is required.

Therefore, the inventors considered control in which assist force by an operation assist device is decreased as vehicle speed increases in a straddled vehicle including a handlebar. The inventors tried to achieve a steering characteristic in accordance with the vehicle speed by this control. The inventors repeated tests under various conditions and found that there was a vehicle speed zone in which, when the assist force was caused to decrease as the vehicle speed increased, the rider feels that force that was input to the handlebar was heavy.

For example, when the vehicle speed is high, a rotational moment of the steering wheel is large. Thus, there is a case in which, for steering, the force that is input to the handlebar is large. It is considered that this is because influence of increase in rotation moment of the steering wheel along with increase in the vehicle speed increases. Also, it is considered that, when a steering ratio that is a ratio of the steering angle of the steering wheel to the rotation angle of the handlebar is close to 1, the influence further increases. In such a case, it is preferable to increase the assist force as the vehicle speed increases.

That is, the inventors found that there is a case in which, in the straddled vehicle including a handlebar, required assist force decreases as the vehicle speed increases and increases as the vehicle speed further increases. Then, the inventors arrived at control in which, in a first vehicle speed zone of the whole vehicle speed zone, the assist force is decreased as the vehicle speed increases and, in a second vehicle speed zone that is higher than the first vehicle speed zone, the assist force is increased as the vehicle speed increases. By this control, it is possible to provide a straddled vehicle including a handlebar with which a different steering characteristic from that of a conventional straddled vehicle can be achieved. Based on the above-described findings, the inventors arrived at the following embodiments.

(First Structure)

A straddled vehicle in a first structure includes a vehicle body frame, a steering shaft, a handlebar, a steering wheel, and a steering assist device. The steering shaft is swingably supported by the vehicle body frame around an axis that extends in an up-down direction of the vehicle body frame. The handlebar includes a left grip located at a left of a center of the straddled vehicle in a left-right direction thereof and a right grip located at a right of the center of the straddled vehicle in the left-right direction thereof and is connected to the steering shaft. The steering wheel is connected to the steering shaft. The steering assist device applies assist force in the same direction as that of a steering torque that has been input to the handlebar by a rider to the steering shaft. When the steering torque that has been input to the handlebar by the rider is constant, the steering assist device causes the assist force to decrease as the speed of the vehicle increases in a first vehicle speed zone and causes the assist force to increase as the speed of the vehicle increases in the second vehicle speed zone that is higher than the first vehicle speed zone.

According to the above-described first structure, the steering assist device of the straddled vehicle applies assist force in the same direction as that of the steering torque that has been input to the handlebar by the rider to the steering shaft that is connected to the handlebar and extends in the up-down direction. The steering assist device causes assist force to the steering torque that has been input to decrease as the speed of the vehicle increases in the first vehicle speed zone of the whole vehicle speed zone. Furthermore, the steering assist device is able to cause the assist force to the steering torque that has been input to increase as the speed of the vehicle increases in the second vehicle speed zone that is higher than the first vehicle speed zone. Thus, it is possible to provide a straddled vehicle including a handlebar with which a different steering characteristic from that of a conventional straddled vehicle can be achieved. Note that the speed of the vehicle is speed of the vehicle in a traveling direction thereof.

(Second Structure)

In the above-described first structure, a decrease amount of the assist force that decreases as the speed of the vehicle increases in the first vehicle speed zone can be made larger than an increase amount of the assist force that increases as the speed of the vehicle increases in the second vehicle speed zone. Thus, it is possible to provide a straddled vehicle including a handlebar with which a different steering characteristic from that of a conventional straddled vehicle can be achieved.

(Third Structure)

In the above-described first or second structure, a ratio of a decrease amount of the assist force to a change amount of the speed of the vehicle in the first vehicle speed zone may be made larger than a ratio of an increase amount of the assist force to a change amount of the speed of the vehicle in the second vehicle speed zone. Thus, it is possible to provide a straddled vehicle including a handlebar with which a different steering characteristic from that of a conventional straddled vehicle can be achieved.

(Fourth Structure)

In any one of the above-described first to third structures, in the steering assist device, a low-speed assist-force-constant vehicle speed zone in which the assist force is constant with respect to change in the speed of the vehicle may be provided in a lower vehicle speed zone than the first vehicle speed zone in which the assist force is caused to decrease as the speed of the vehicle increases. Thus, it is possible to provide a straddled vehicle including a handlebar with which a different steering characteristic from that of a conventional straddled vehicle can be achieved.

(Fifth Structure)

In any one of the above-described first to fourth structures, in the steering assist device, a high-speed assist-force-constant vehicle speed zone in which the assist force is constant with respect to change in the speed of the vehicle may be provided in a higher vehicle speed zone than the second vehicle speed zone in which the assist force is caused to increase as the speed of the vehicle increases. Thus, it is possible to provide a straddled vehicle including a handlebar with which a different steering characteristic from that of a conventional straddled vehicle can be achieved.

(Sixth Structure)

In any one of the above-described first to fifth structures, the first vehicle speed zone and the second vehicle speed zone may be adjacent to one another. That is, the steering assist device is able to control the assist force such that the first vehicle speed zone and the second vehicle speed zone are adjacent to one another. Thus, it is possible to provide a straddled vehicle including a handlebar with which a different steering characteristic from that of a conventional straddled vehicle can be achieved.

(Seventh Structure)

In any one of the above-described first to fifth structures, there may be an intermediate assist-force-constant vehicle speed zone in which the assist force is constant with respect to change in the speed of the vehicle between the first vehicle speed zone and the second vehicle speed zone. That is, in the steering assist device, the intermediate assist-force-constant vehicle speed zone in which the assist force is constant with respect to change in the speed of the vehicle may be provided between the first vehicle speed zone and the second vehicle speed zone. Thus, it is possible to provide a straddled vehicle including a handlebar with which a different steering characteristic from that of a conventional straddled vehicle can be achieved.

(Eighth Structure)

In any one of the above-described first to seventh structures, the steering assist device may be configured to cause, when the steering torque that has been input to the handlebar by the rider is larger than a first threshold and is constant, the assist force to decrease as the speed of the vehicle increases in the first vehicle speed zone and the assist force to increase as the speed of the vehicle increases in the second vehicle speed that is higher than the first vehicle speed zone. Thus, it is possible to provide a straddled vehicle including a handlebar with which a different steering characteristic from that of a conventional straddled vehicle can be achieved.

The straddled vehicles of the above-described first to eighth structures can be implemented as the following embodiments. A steering assist device in an embodiment of the present teaching is a steering assist device that assists rotation of a steering system that transmits rotation of a handlebar of the straddled vehicle to a wheel. The steering assist device includes a drive unit that outputs assist force that assists rotation of the steering system. In at least a portion of the whole vehicle speed zone of the straddled vehicle, assist of the drive unit to the steering torque of the handlebar increases as the speed of the vehicle increases (the first structure).

In the above-described first structure, in the whole vehicle speed zone, there is a vehicle speed zone in which assist to a steering torque increases as the speed of the vehicle increases. Thus, in a situation in which large steering force is required in accordance with the speed of the vehicle, assist in accordance with requirement is possible.

In the above-described first structure, an aspect in which, in at least a portion of the whole vehicle speed zone of the straddled vehicle, when the steering torque is larger than the first threshold and the speed of the vehicle increases then, assist of the drive unit to the steering torque is large, can be employed (the second structure). According to the second structure, steering assist when a larger steering torque than the first threshold is input can be caused to increase as the speed of the vehicle increases.

In the above-described first or second structure, an aspect in which, when the speed of the vehicle is within a predetermined vehicle speed zone, assist of the drive unit to the steering torque of the handlebar increases as the speed of the vehicle increases can be employed (the third structure).

In any one of the above-described first to third structures, the steering assist device can be configured to include a torque detection unit that detects the steering torque of the handlebar, a vehicle speed sensor that detects the speed of the vehicle, and an assist control unit that controls the drive unit, based on the steering torque that has been detected by the torque detection unit and the speed of the vehicle, which has been detected by the vehicle speed sensor (the fourth structure).

In the above-described fourth structure, assist by the drive unit can be determined based on the steering torque and the speed of the vehicle. The assist control unit is able to control the drive unit such that, in at least a portion of the whole vehicle speed zone of the straddled vehicle, the assist of the drive unit to the steering torque of the handlebar increases as the speed of the vehicle increases.

A straddled vehicle including the steering assist device of any one of the above-described first to fourth structures is included in an embodiment of the present teaching.

A steering assist method according to an embodiment of the present teaching is a steering assist method in which rotation of a transmission unit that transmits rotation of the handlebar of the straddled vehicle to a wheel is assisted. The steering assist method includes steps of detecting a steering torque of the handlebar, detecting speed of the straddled vehicle, and causing a drive unit to output assist force that assists rotation of the steering system. In at least a portion of the whole vehicle speed zone of the straddled vehicle, assist of the drive unit to the steering torque increases as the speed of the vehicle increases.

DETAILED DESCRIPTION

Figure 1:
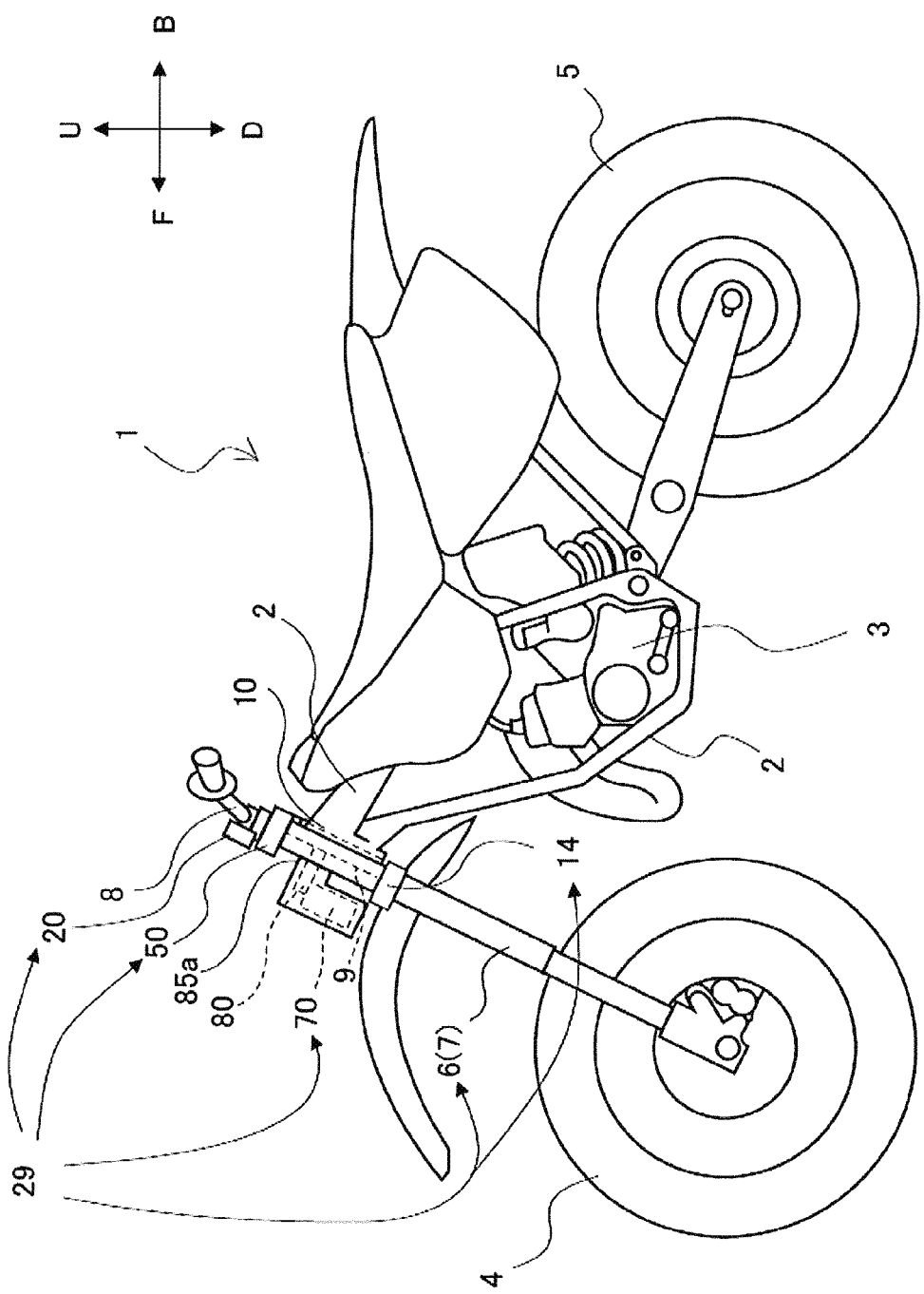
FIG. 1 is a side view of a motorcycle according to an embodiment of the present teaching.

Embodiments of the present teaching will be described in detail below with reference to the accompanying drawings.

In the drawings, an arrow F indicates a forward direction of a vehicle body frame. An arrow B indicates a rear direction of the vehicle body frame. An arrow U indicates an upward direction of the vehicle body frame. An arrow D indicates a downward direction of the vehicle body frame. An arrow R indicates a right direction of the vehicle body frame. An arrow L indicates a left direction of the vehicle body frame. An up-down direction of the vehicle body frame in a state in which the vehicle body frame stands upright and is not turning matches a vertical direction.

A "front-rear direction of the vehicle body frame", a "left-right direction of the vehicle body frame", and an "up-down direction of the vehicle body frame" herein mean a front-rear direction, a left-right direction, and an up-down direction when viewed from an occupant who drives a vehicle with the vehicle body frame as a reference.

"Extending in the front-rear direction of the vehicle body frame" herein includes extending in a direction tilted with respect to the front-rear direction of the vehicle body frame. In this case, a tilt of an extending direction with respect to the front-rear direction of the vehicle body frame is smaller than a tilt thereof with respect to the left-right direction and the up-down direction of the vehicle body frame in many cases.

"Extending in the left-right direction of the vehicle body frame" herein includes extending in a direction tilted with respect to the left-right direction of the vehicle body frame. In this case, a tilt of an extending direction with respect to the left-right direction of the vehicle body frame is smaller than a tilt thereof with respect to the front-rear direction and the up-down direction of the vehicle body frame in many cases.

"Extending in the up-down direction of the vehicle body frame" herein includes extending in a direction tilted with respect to the up-down direction of the vehicle body frame. In this case, a tilt of an extending direction with respect to the up-down direction of the vehicle body frame is smaller than a tilt thereof with respect to the front-rear direction and the left-right direction of the vehicle body frame in many cases.

"Connection" herein includes, for example, connection in a case in which two members are directly connected and connection in a case in which two members are indirectly connected via another member.

Figure 20:
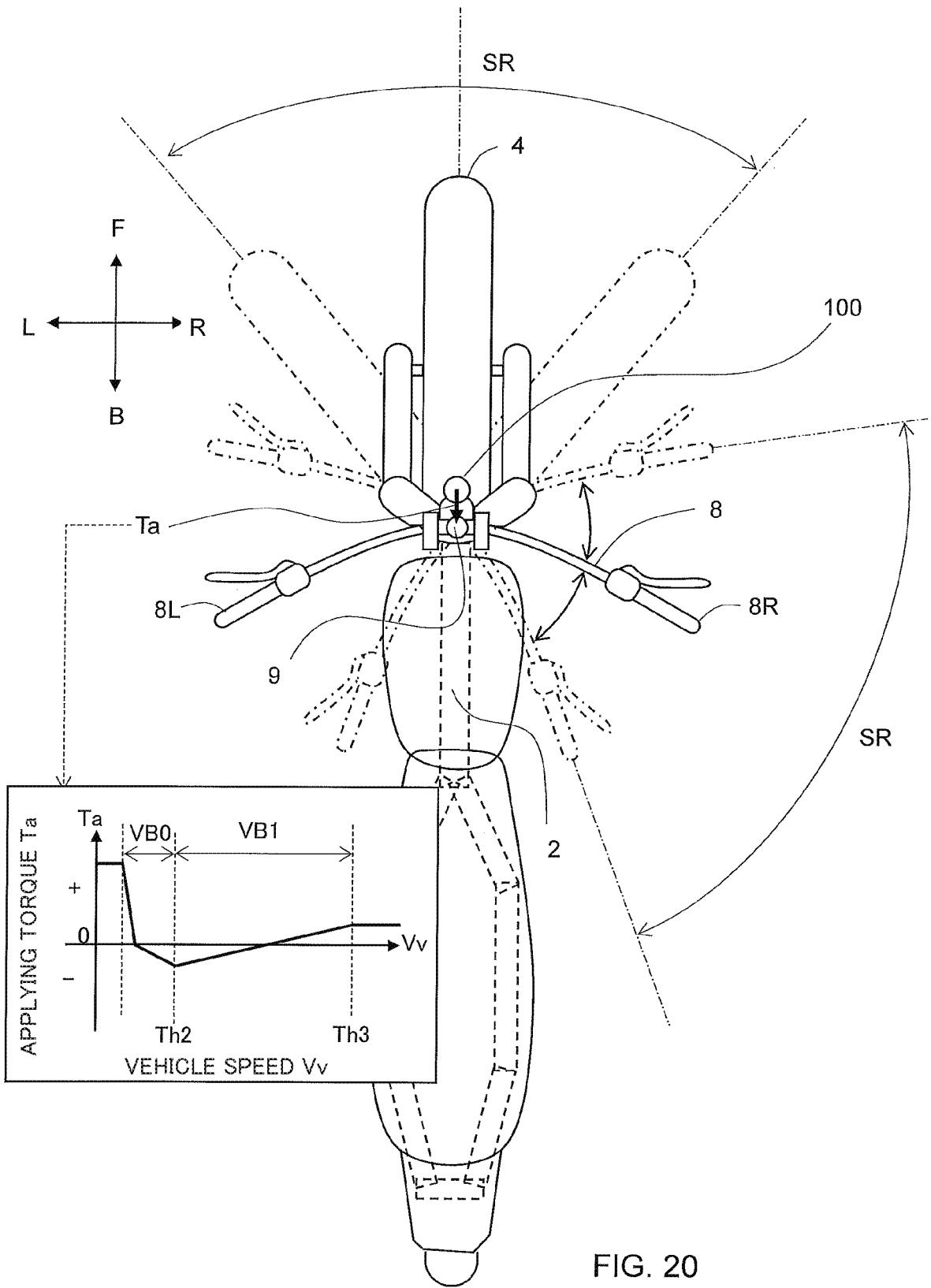
FIG. 20 is a view illustrating a structure of a straddled vehicle in an embodiment of the present teaching.

FIG. 20 is a view illustrating a structure of a straddled vehicle in an embodiment of the present teaching. The straddled vehicle illustrated in FIG. 20 includes a vehicle body frame 2, a steering shaft 9, a handlebar 8, a steering wheel 4, and a steering assist device 100. The steering shaft 9 is swingably supported by the vehicle body frame 2 around an axis that extends in an up-down direction of the vehicle body frame 2. The handlebar 8 includes a left grip 8L located at a left of a center of the straddled vehicle in a left-right direction thereof and a right grip 8R located at a right of the center of the straddled vehicle in the left-right direction thereof and is connected to the steering shaft 9. A range SR in which the handlebar 8 is able to swing around the axis of the steering shaft 9 is 180 degrees (½ rotation) or less. The steering wheel 4 is connected to the steering shaft 9. The steering assist device 100 applies assist force in the same direction as that of a steering torque that has been input to the handlebar 8 by a rider to the steering shaft 9. When the steering torque that has been input to the handlebar 8 by the rider is constant, the steering assist device 100 causes assist force Ta to decrease as speed of the vehicle increases in a first vehicle speed zone VB0 and causes the assist force Ta to increase as the speed of the vehicle increases in a second vehicle speed zone VB1 that is higher than the first vehicle speed zone VB0. If the steering torque is the same, the assist force that is applied to the steering shaft 9 by the steering assist device 100 in the first vehicle speed zone VB0 is smaller when the speed of the vehicle is high than when the speed of the vehicle is low. If the steering torque is the same, the assist force that is applied to the steering shaft 9 by the steering assist device 100 in the second vehicle speed zone VB1 is larger when the speed of the vehicle is high than when the speed of the vehicle is low.

FIG. 1 is a side view of a motorcycle 1 according to an embodiment of the present teaching. As illustrated in FIG. 1, the motorcycle 1 includes a handlebar 8, a vehicle body frame 2, an engine 3 suspended on the vehicle body frame 2, a front wheel 4 attached to a front portion of the vehicle body frame 2, and a rear wheel 5 attached to a rear portion of the vehicle body frame 2. The rear wheel 5 is driven by the engine 3. The handlebar 8 is rotatably attached to the vehicle body frame 2. Rotation of the handlebar 8 is transmitted to the front wheel 4 that is a steering wheel. The rider operates the handlebar 8 to steer the motorcycle 1. The motorcycle 1 is a vehicle that is able to turn by tilting the vehicle body frame 2 in the left-right direction. A movable range of the handlebar 8 is 180 degrees (½ rotation) or less. The movable range is a difference (lock to lock) between a steering angle when the handlebar 8 is maximally operated to the left and a steering angle when the handlebar 8 is maximally operated to the right.

In the motorcycle 1, a head pipe 10 is formed in the front portion of the vehicle body frame 2 so as to be integrated with the vehicle body frame 2. The steering shaft 9 passes through the head pipe 10. The steering shaft 9 is rotatably supported by the head pipe 10 that is a portion of the vehicle body frame 2. A top bridge 50 is connected to an upper portion of the steering shaft 9. A bottom bridge 14 is connected to a lower portion of the steering shaft 9. The top bridge 50 and the bottom bridge 14 are fixed to the steering shaft 9 and rotate with the steering shaft 9.

A transmission member 20 is connected to the top bridge 50. The handlebar 8 is connected to the transmission member 20. That is, the handlebar 8 and the steering shaft 9 are connected with one another via the transmission member 20. The steering shaft 9 rotates in accordance with rotation of the handlebar 8.

A left buffer 6 and a right buffer 7 are arranged at left and right of the steering shaft 9, respectively. The left buffer 6 and the right buffer 7 are fixed to the top bridge 50 and the bottom bridge 14. The left buffer 6 and the right buffer 7 support the front wheel 4 in lower end portions such that the front wheel 4 can freely rotate. The left buffer 6 and the right buffer 7 form a front fork. The left buffer 6 and the right buffer 7 support the front wheel 4 such that the front wheel 4 can be displaced with respect to the vehicle body frame 2 in the up-down direction.

In the motorcycle 1 illustrated in FIG. 1, the transmission member 20, the top bridge 50, the bottom bridge 14, the left buffer 6, the right buffer 7, and the steering shaft 9 are examples of a steering system 29 (a steering force transmission mechanism) which transmits rotation of the handlebar 8 to the front wheel 4. The steering system 29 is provided between the handlebar 8 and a wheel and rotates in accordance with the rotation of the handlebar 8 to transmit rotation of the handlebar 8 to the wheel. The steering system 29 is rotatably supported with respect to the vehicle body frame 2 (the head pipe 10 in the example of FIG. 1).

The motorcycle 1 includes a steering assist device that assists steering by the handlebar 8. In the motorcycle 1, as a portion of the steering assist device, a motor 70 (an example of a drive unit) which outputs assist force that assists rotation of the steering system 29 is provided. Rotation of the motor 70 is transmitted to the steering shaft 9 via a reducer 80. The motor 70 is attached to the head pipe 10 via an attaching portion 85a. Details of the steering assist device will be described later.

Figure 2:
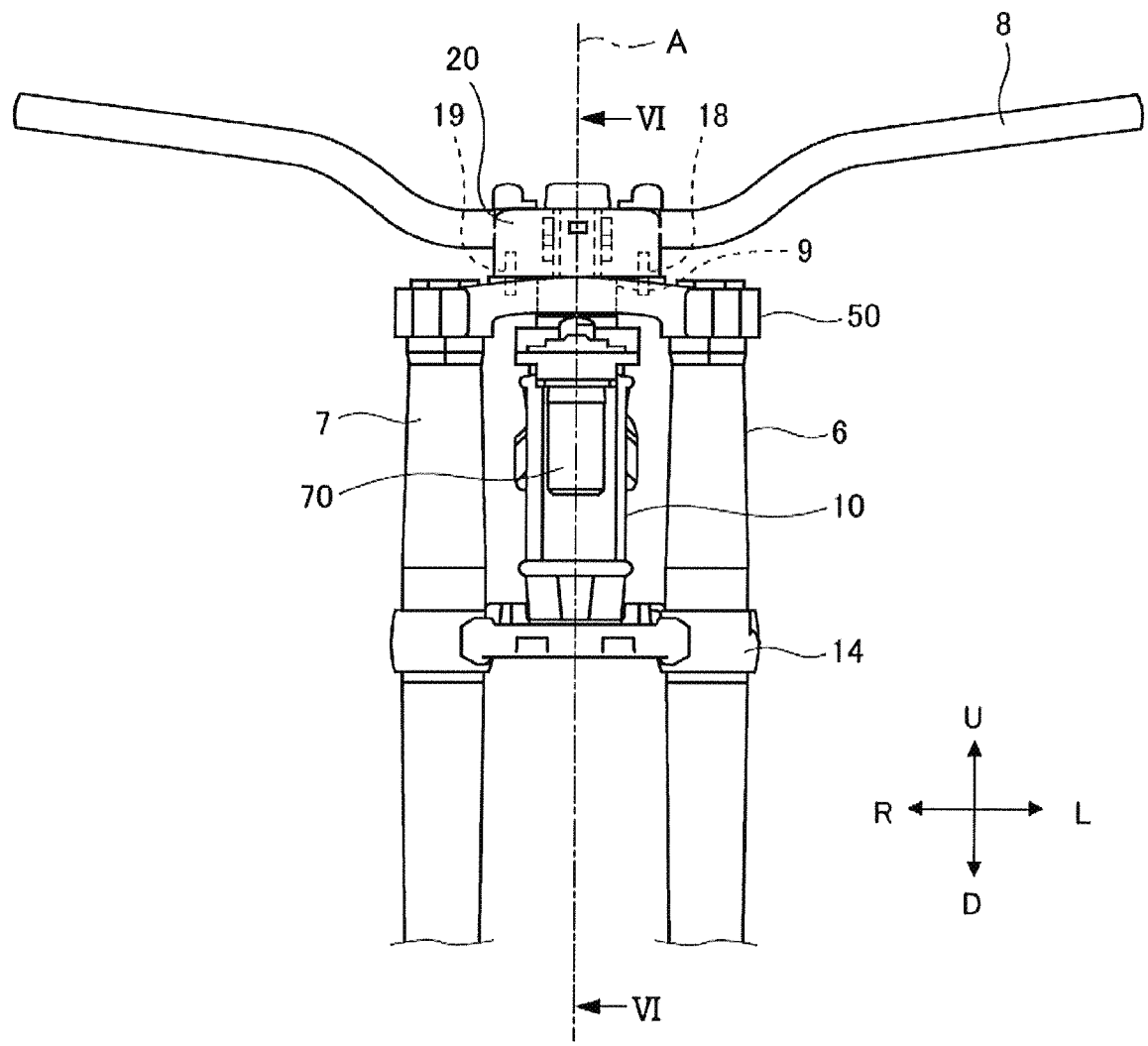
FIG. 2 is a front view illustrating a portion of the vehicle illustrated in FIG. 1.

FIG. 2 is a front view illustrating a portion of the motorcycle 1 illustrated in FIG. 1. As illustrated in FIG. 2, when viewed from the front, the head pipe 10 is arranged between the left buffer 6 and the right buffer 7. The left buffer 6 and the right buffer 7, the head pipe 10 and the steering shaft 9 are arranged in parallel.

The head pipe 10 is a cylindrical member that extends in the up-down direction. The steering shaft 9 is rotatably supported inside the head pipe 10. The steering shaft 9 is rotatable around a steering axial line A that extends in the up-down direction. An upper portion of the steering shaft 9 is fixed to the top bridge 50.

The upper portion of the steering shaft 9, an upper portion of the left buffer 6, and an upper portion of the right buffer 7 are connected to the top bridge 50. Each of the steering shaft 9, the left buffer 6, and the right buffer 7 is unrotatably attached to the top bridge 50. The top bridge 50 connects the steering shaft 9, the left buffer 6, and the right buffer 7. The top bridge 50 is provided higher than an upper end of the head pipe 10. Also, the top bridge 50 is provided lower than the handlebar 8.

The bottom bridge 14 that connects the left buffer 6 and the right buffer 7 is provided in a position located lower than the top bridge 50. The left buffer 6 and the right buffer 7 are unrotatably attached to the bottom bridge 14. The bottom bridge 14 is provided lower than the head pipe 10. The front wheel 4 is supported from left and right sides by the left buffer 6 and the right buffer 7 below the bottom bridge 14. Thus, the steering shaft 9, the left buffer 6, the right buffer 7, and the front wheel 4 are integrally rotatable around the steering axial line A.

Figure 3:
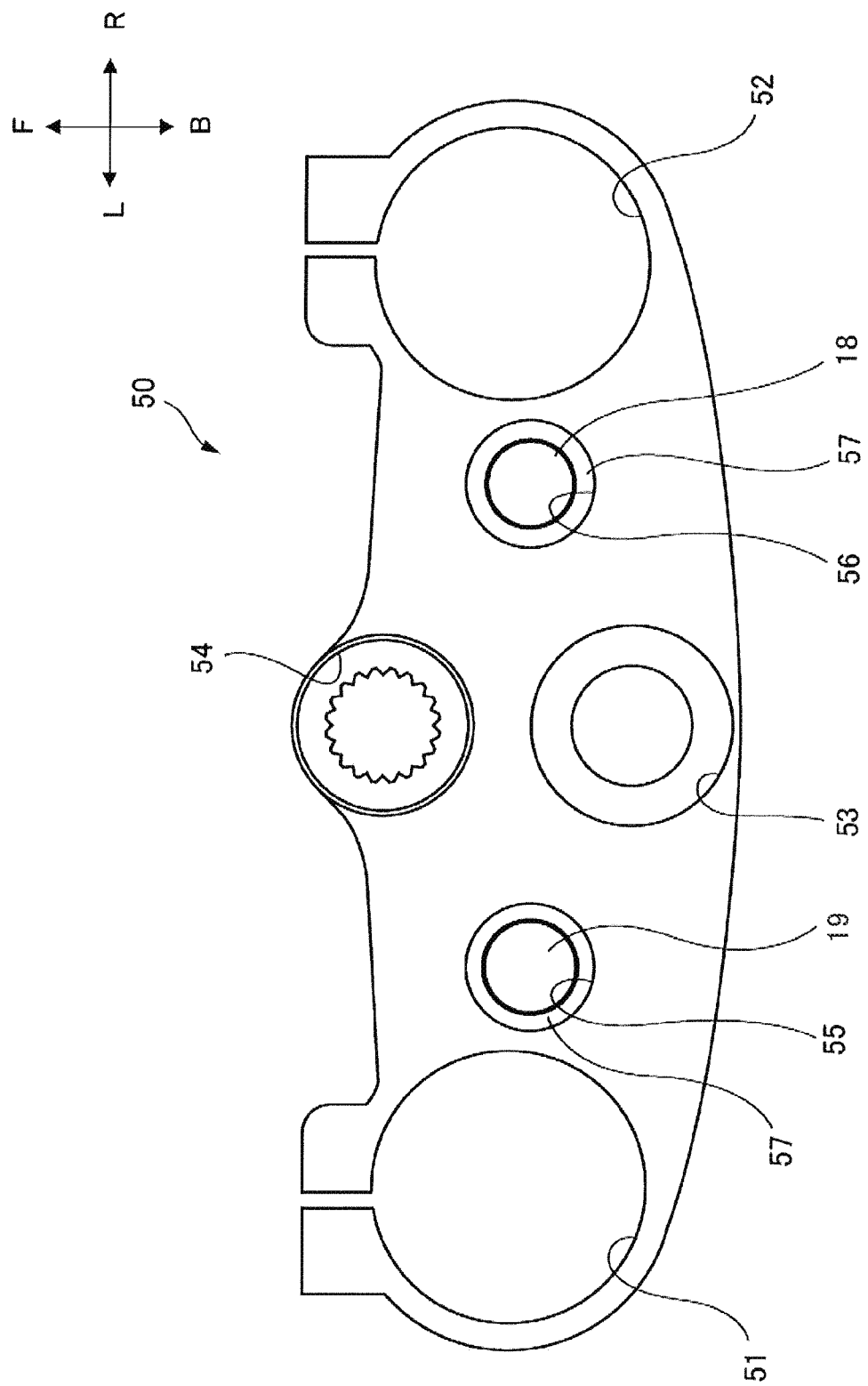
FIG. 3 is a top view of a top bridge.

FIG. 3 is a top view of the top bridge 50. As illustrated in FIG. 3, a left supporting hole 51 in which the upper portion of the left buffer 6 is fitted is provided in a left portion of the top bridge 50. A right supporting hole 52 in which the upper portion of the right buffer 7 is fitted is provided in a right portion of the top bridge 50.

A rear supporting hole 53 is provided in a position that is a center portion of the top bridge 50 in the left-right direction and is also a rear portion of the top bridge 50. The upper portion of the steering shaft 9 is fitted in the rear supporting hole 53. A front supporting hole 54 is provided in a position that is the center portion of the top bridge 50 in the left-right direction and is also in front of the rear supporting hole 53. A spline groove is formed in an inner peripheral surface of the front supporting hole 54. A shaft member 12 (which will be described later) which is a portion of the transmission member 20 is fitted in the front supporting hole 54.

When the handlebar 8 rotates, the top bridge 50 rotates abound the steering axial line A (see FIG. 2). When the top bridge 50 rotates, the left buffer 6 fixed to the left portion of the top bridge 50 and the right buffer 7 fixed to the right portion of the top bridge 50 also move around the steering axial line A. Thus, the front wheel 4 supported by the left buffer 6 and the right buffer 7 is steered to turn. In the above-described manner, when the rider operates the handlebar 8, the front wheel 4 is steered to turn in accordance with the operation of the handlebar 8.

(Transmission Member 20)

Figure 4:
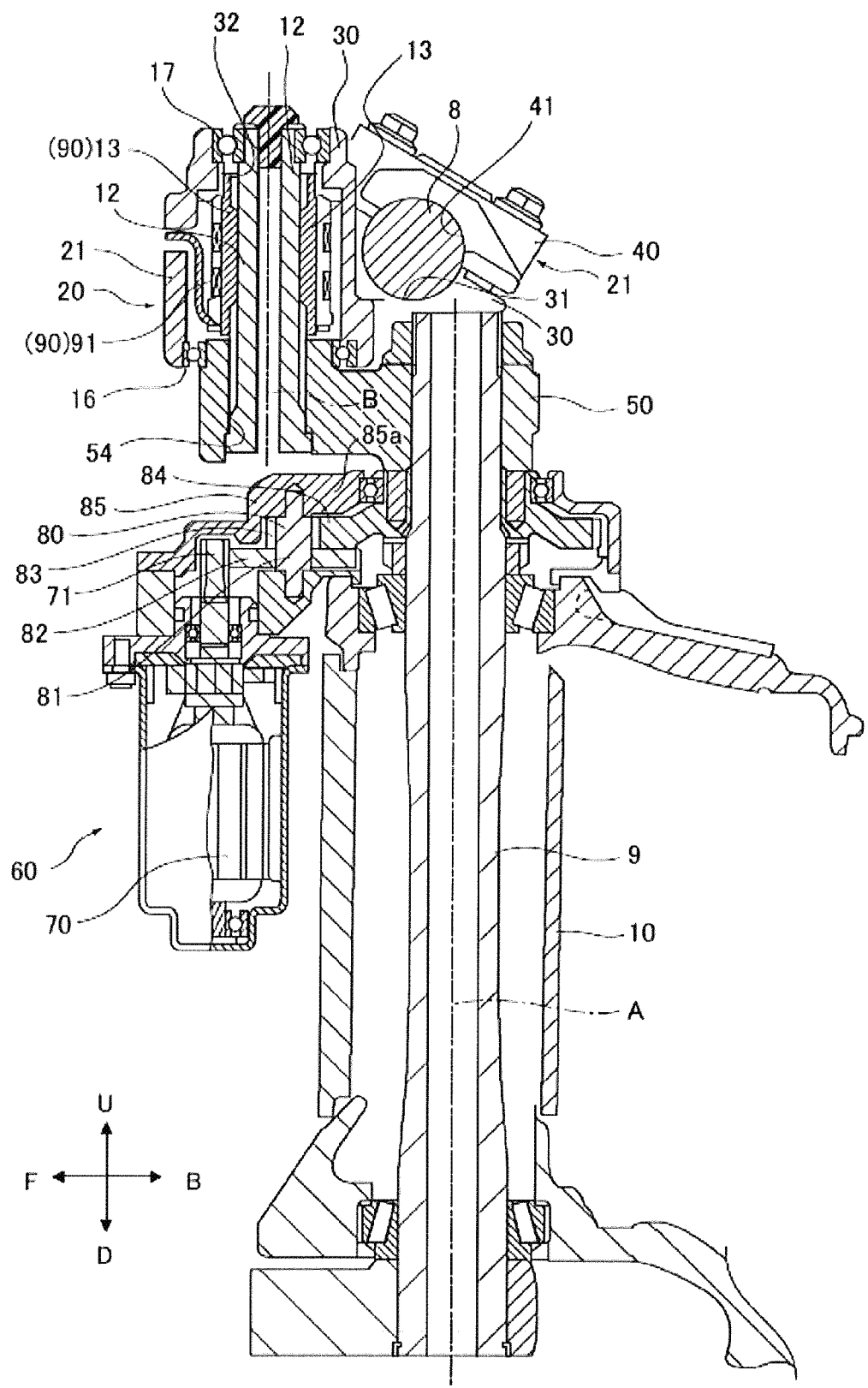
FIG. 4 is a cross-sectional view taken along the line VI-VI of FIG. 2.

Next, how the steering force that has been input to the handlebar 8 is transmitted to the top bridge 50 via the transmission member 20 will be described with reference to FIG. 4. FIG. 4 is a cross-sectional view taken along the line VI-VI of FIG. 2.

In an example illustrated in FIG. 4, the transmission member 20 includes a handle holder 21 (an example of a first portion) which is fixed to the handlebar 8, the shaft member 12 (an example of a second portion) which is fixed to the top bridge 50, and a torque transmission unit 13.

The shaft member 12 is fixed to the top bridge 50 in a position located more forward than the steering shaft 9. The shaft member 12 is a cylindrical member an axial line of which extends in the same direction as a direction in which the steering shaft 9 extends. A lower portion of the shaft member 12 is spline-fitted in the front supporting hole 54 of the top bridge 50. The shaft member 12 is fixed to the top bridge 50 so as not to be relatively rotatable with respective to the top bridge 50.

When steering force is input to the handlebar 8, the shaft member 12 is relatively displaced with respect to the handle holder 21 in accordance with the steering force. In this embodiment, when steering force is input to the handlebar 8, the handle holder 21 relatively rotates around a central axial line B of the torque transmission unit 13 with respect to the shaft member 12 in accordance with the steering force.

(Handle Holder 21)

The handle holder 21 is provided higher than the top bridge 50. The handle holder 21 holds the handlebar 8. The handle holder 21 includes a lower member 30 and an upper member 40. The upper member 40 is fixed to an upper portion of the lower member 30. The handlebar 8 is interposed between a lower handle receiving unit 31 of the lower member 30 and an upper handle receiving unit 41 of the upper member 40; the lower handle receiving unit 31 and the upper handle receiving unit 41 fix the handlebar 8.

The handle holder 21 includes a through hole 32 through which the shaft member 12 is inserted. An upper bearing 17 is provided in an upper portion of the through hole 32. An inner ring 17a of the upper bearing 17 is fixed to the shaft member 12 and an outer ring 17b of the upper bearing 17 is fixed to the handle holder 21. Thus, the shaft member 12 is rotatably arranged in the through hole 32 of the handle holder 21.

A lower bearing 16 is provided in a lower portion of the handle holder 21. An outer ring 16b of the lower bearing 16 is fixed to the handle holder 21. An inner ring 16a of the lower bearing 16 is fixed to the top bridge 50. Thus, the handle holder 21 is rotatably supported by the top bridge 50.

Figure 5A:
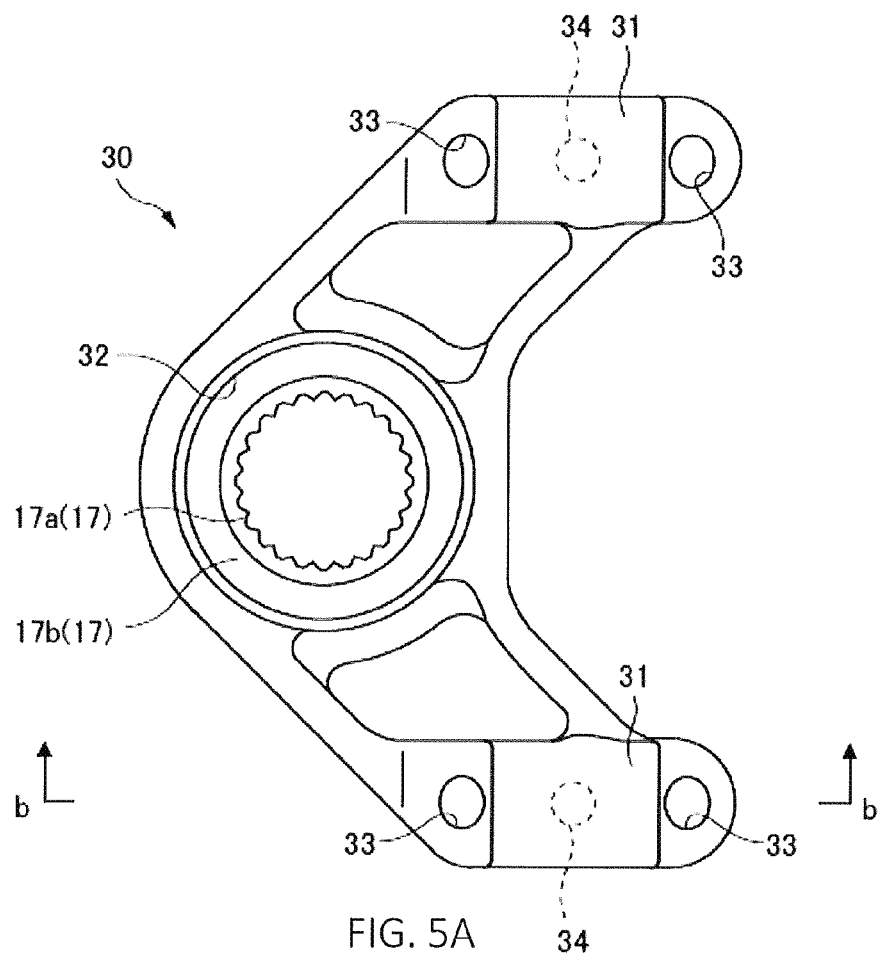
FIG. 5A is a top view of a lower member of a handle holder.
Figure 5B:
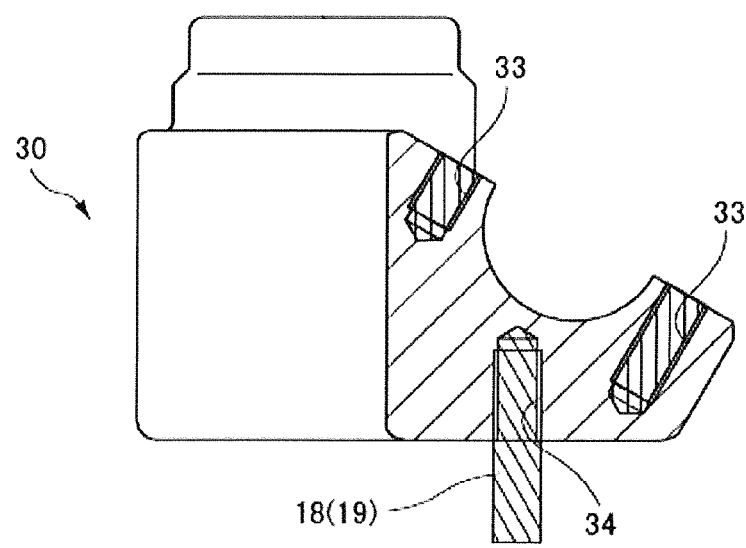
FIG. 5B is a cross-sectional view taken along the line b-b of FIG. 5A.

FIG. 5A is a top view of the lower member 30 and FIG. 5B is a cross-sectional view taken along the line b-b of FIG. 5A. As illustrated in FIG. 5A, the through hole 32 through which the shaft member 12 is inserted is provided in the lower member 30. The upper bearing 17 is provided in the through hole 32. An inner ring 17a of the upper bearing 17 is fixed such that the shaft member 12 is unrotatable, as described above. The lower handle receiving unit 31 is formed at each of left and right of the through hole 32.

A pair of first screw holes 33 is provided in an upper surface of the lower member 30. The pair of first screw holes 33 is arranged in front of and behind the lower handle receiving unit 31. A position of the upper member 40 is adjusted with respect to the lower member 30 such that the upper handle receiving unit 41 is opposed to the lower handle receiving unit 31 and a screw is screwed in each of the first screw holes 33, so that the upper member 40 is fixed to the lower member 30.

As illustrated in FIG. 5B, second screw holes 34 are provided in a lower surface of the lower member 30. The second screw holes 34 are provided at left and right of the through hole 32. A left auxiliary transmission member 19 is screwed in the second screw hole 34 in a left portion of the lower member 30. A right auxiliary transmission member 18 is screwed in the second screw hole 34 in a right portion of the lower member 30. Each of the pair of second screw holes 34 is provided in a position that corresponds to a corresponding one of a left intermediate hole 55 and a right intermediate hole 56 (see FIG. 3) provided in the top bridge 50. Therefore, the left auxiliary transmission member 19 and the right auxiliary transmission member 18 pass through the left intermediate hole 55 and the right intermediate hole 56 of the top bridge 50, respectively.

(Torque Transmission Unit 13)

Figure 6:
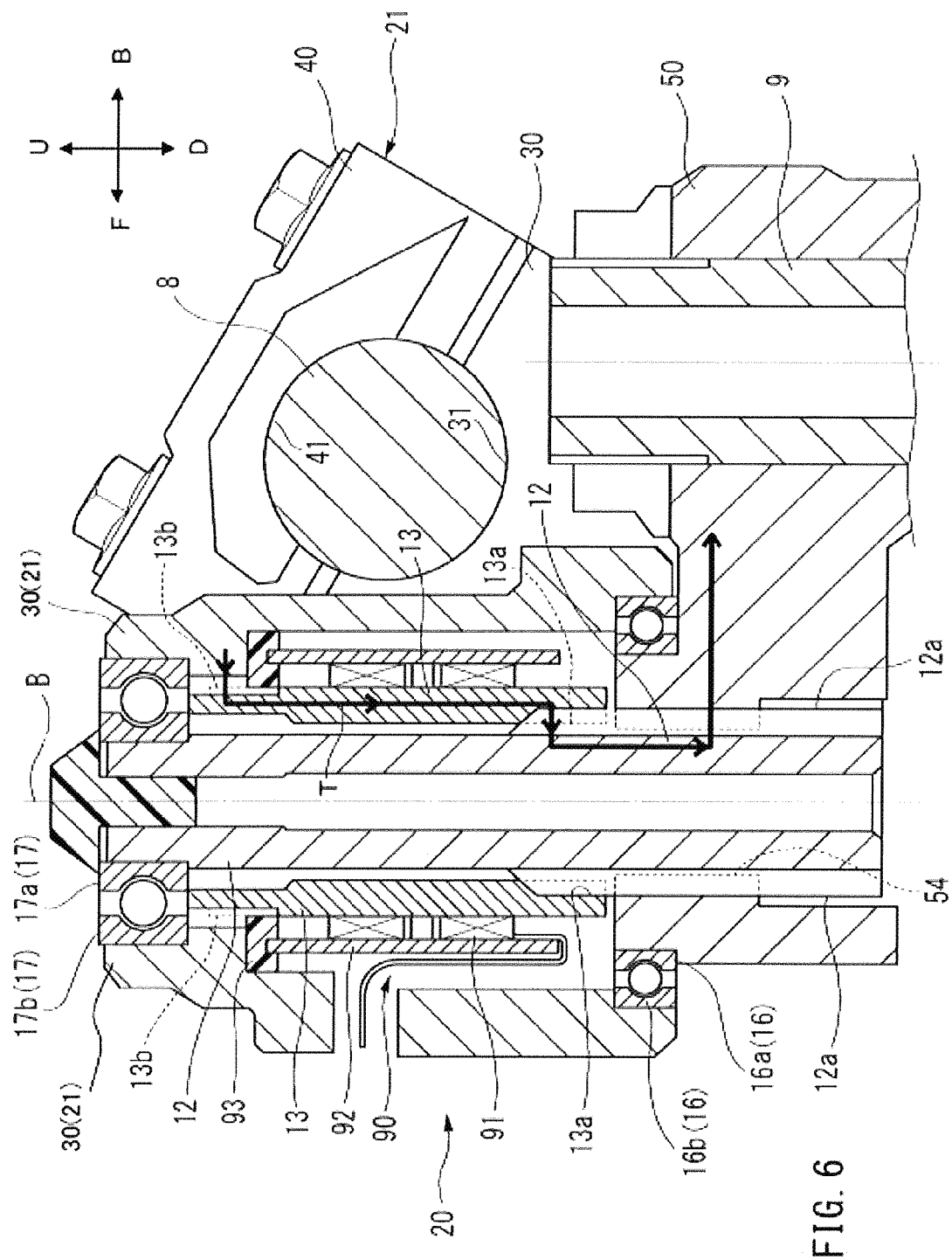
FIG. 6 is an enlarged view of FIG. 4.

FIG. 6 is an enlarged view of a portion of FIG. 4. As illustrated in FIG. 6, the torque transmission unit 13 is provided between the shaft member 12 and the handle holder 21. The torque transmission unit 13 is a cylindrical member made of metal. An inner diameter of the torque transmission unit 13 having a cylindrical shape is substantially equal to an outer diameter of the shaft member 12. An inner peripheral surface of the torque transmission unit 13 surrounds an outer peripheral surface of the shaft member 12. The torque transmission unit 13 is arranged in an outer side of the shaft member 12 and an inner side of the handle holder 21. A portion of the torque transmission unit 13 is fixed to the handle holder 21 and another portion thereof is fixed to the shaft member 12.

Specifically, a spline groove is provided in an inner peripheral surface of a lower portion of the torque transmission unit 13. The lower portion of the torque transmission unit 13 is not fixed to the lower member 30 and is spline-fitted in the outer peripheral surface of the shaft member 12. A spline groove is provided in an outer peripheral surface of an upper portion of the torque transmission unit 13. The upper portion of the torque transmission unit 13 is not fixed to the shaft member 12 and is spline-fitted with the lower member 30.

When the steering force acts from the handlebar 8 and the handle holder 21 rotates with respect to the shaft member 12, the torque transmission unit 13 is twisted to transmit the steering force from the lower member 30 to the shaft member 12. That is, the steering force that has been input to the handlebar 8 is transmitted to the top bridge 50 via the torque transmission unit 13.

(Auxiliary Transmission Members 18 and 19)

Note that, in this embodiment, steering force is transmitted from the handlebar 8 to the top bridge 50 via the right auxiliary transmission member 18 and the left auxiliary transmission member 19 in addition to the torque transmission unit 13.

As illustrated in FIG. 3, in the top bridge 50, the left intermediate hole 55 is provided in a position that is located between the left supporting hole 51 and the rear supporting hole 53 and is also more forward than the rear supporting hole 53. A rubber ring 57 is fitted in an inner peripheral surface of the left intermediate hole 55. Also, the right intermediate hole 56 is provided in a position that is located between the right supporting hole 52 and the rear supporting hole 53 and is also more forward than the rear supporting hole 53. The rubber ring 57 is fitted in an inner peripheral surface of the right intermediate hole 56.

The left auxiliary transmission member 19 fixed to the lower member 30 passes through the left intermediate hole 55 of the top bridge 50. The right auxiliary transmission member 18 fixed to the lower member 30 passes through the right intermediate hole 56 of the top bridge 50.

As illustrated in FIG. 3, the rubber ring 57 is provided between the left auxiliary transmission member 19 and the inner peripheral surface of the left intermediate hole 55. The rubber ring 57 is provided between the right auxiliary transmission member 18 and the inner peripheral surface of the right intermediate hole 56. When the rider applies steering force to the handlebar 8, after the torque transmission unit 13 is twisted, the rubber ring 57 is elastically deformed and the left auxiliary transmission member 19 applies the steering force to an inner wall of the left intermediate hole 55 via the rubber ring 57. Also, after the torque transmission unit 13 is twisted, the rubber ring 57 is elastically deformed and the right auxiliary transmission member 18 applies the steering force to an inner wall of the right intermediate hole 56 via the rubber ring 57.

That is, the left auxiliary transmission member 19 and the right auxiliary transmission member 18 auxiliarily transmit the steering force that has been input to the handlebar 8 to the top bridge 50. As described above, it is not only on the torque transmission unit 13 that the steering force acts, and therefore, rigidity that is required for the torque transmission unit 13 is not large and increase in size of the torque transmission unit 13 is restrained.

(Torque Sensor 90)

In this embodiment, a torque sensor 90 is a magnetostrictive torque sensor. As illustrated in FIG. 6, the torque sensor 90 includes the torque transmission unit 13 as a member to be detected and a pickup coil 91 as a detection member. The pickup coil 91 is provided on an outer circumference of the torque transmission unit 13. The pickup coil 91 is fixed to a mounting substrate 92. The mounting substrate 92 is fixed to the lower member 30 of the handle holder 21 via a bush 93.

In FIG. 6, arrows T indicate a force transmission route. As indicated by the arrows T, when steering force is input to the handlebar 8, the force acts on the handle holder 21. The force that has been input to the lower member 30 of the handle holder 21 is transmitted to the torque transmission unit 13 via a spline groove 13b provided in the upper portion of the torque transmission unit 13. Furthermore, the force is transmitted to the shaft member 12 via a spline groove 13a provided in the lower portion of the torque transmission unit 13. The shaft member 12 transmits the steering force to the top bridge 50 via a spline groove 12a and the front supporting hole 54 in which the spline groove is provided.

The upper portion of the torque transmission unit 13 is fixed to the lower member 30 (an example of a cylindrical member) and the lower portion of the torque transmission unit 13 is fixed to the shaft member 12. Therefore, when the steering force is input to the handlebar 8, the torque transmission unit 13 is twisted. Then, the pickup coil 91 detects change in physical quantity in accordance with this torsion amount. The physical quantity is converted to a value that indicates the steering force by an electronic circuit electrically connected to the pickup coil 91.

In the above-described structure, the motorcycle 1 includes a first member (the handle holder 21 as an example) unrotatably connected to the handlebar 8 and a second member (the shaft member 12 as an example) unrotatably connected to the steering shaft 9. The first member and the second member are connected to one another so as to be relatively displaceable. The torque sensor 90 detects a steering torque of the handlebar 8 by detecting change in physical quantity based on relative displacement of the first member and the second member. In the above-described example, the torque sensor 90 detects the steering torque by measuring a distortion of the torque transmission unit 13 provided between the first member and the second member. The torque sensor 90 is an example of a torque detection unit.

(Assist Force Application Mechanism 60)

As illustrated in FIG. 4, the motorcycle 1 according to this embodiment includes an assist force application mechanism 60 in a front portion of the head pipe 10. The torque sensor 90, the top bridge 50, and the assist force application mechanism 60 are arranged in this order downwardly in the up-down direction of the head pipe 10.

The assist force application mechanism 60 includes the motor 70 and the reducer 80. A motor torque generated by the motor 70 acts on the steering shaft 9 via the reducer 80.

The motor 70 includes an output shaft 71. The motor 70 is attached to the head pipe 10 such that the output shaft 71 is in parallel to the steering axial line A. The output shaft 71 of the motor 70 is provided more forward than the steering axial line A of the steering shaft 9.

The reducer 80 includes a first gear 82 and a second gear 83 fixed onto an intermediate shaft 81. An axial line of the intermediate shaft 81 of the reducer 80, an axial line of the output shaft 71 of the motor 70, and the steering axial line A are in parallel to one another. The first gear 82 engages the output shaft 71 of the motor 70. The second gear 83 of the reducer 80 engages a third gear 84 fixed to an outer peripheral surface of the steering shaft 9.

The motor 70 and the reducer 80 are provided inside a housing 85. The housing 85 includes an attaching portion 85a in a rear portion thereof. The attaching portion 85a of the housing 85 is held between the top bridge 50 and the head pipe 10.

When the motor 70 is driven and the output shaft 71 rotates, a motor torque is transmitted from the output shaft 71 to the first gear 82 of the reducer 80. When the first gear 82 rotates, the second gear 83 rotates with the first gear 82. Rotation of the second gear 83 is transmitted to the third gear 84 of the steering shaft 9. As described above, the motor torque of the motor 70 is transmitted to the steering shaft 9.

The assist force application mechanism 60 includes the motor 70 and the reducer 80 that transmits rotation of the motor to the steering shaft 9. Also, the assist force application mechanism 60 includes the housing 85 that accommodates the motor 70 and the reducer 80. The housing 85 is attached to the head pipe 10 that is a portion of the vehicle body frame 2 of the motorcycle 1. That is, the motor 70 is attached to the vehicle body frame 2 and is configured to assist rotation of a steering system (the steering shaft 9 in the above-described example).

(Steering Assist Device)

Figure 7:
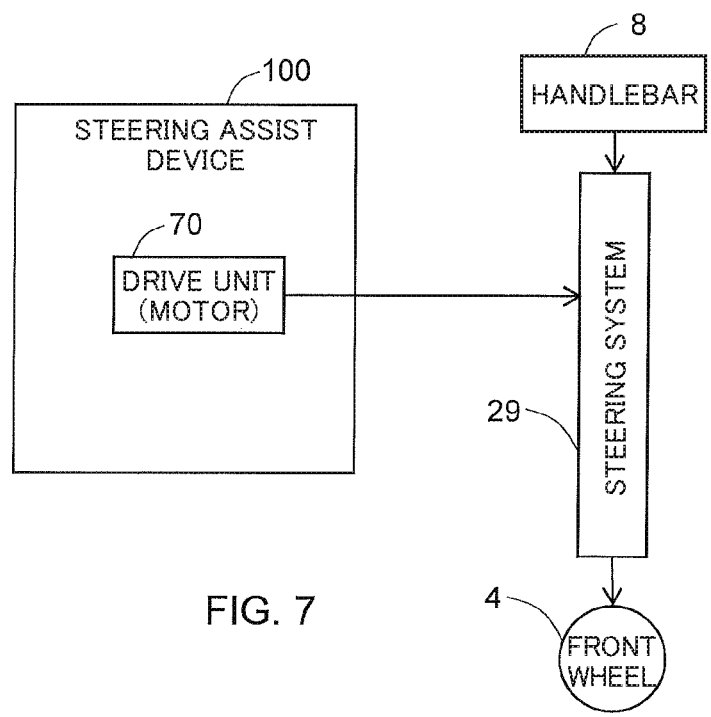
FIG. 7 is a functional block diagram illustrating an example of a structure of a steering assist device.

FIG. 7 is a functional block diagram illustrating an example of a structure of the steering assist device 100. The steering assist device 100 assists rotation of the steering system 29 that transmits rotation of the handlebar 8 to the wheel 4. The steering assist device 100 includes a drive unit 70 that outputs assist force that assists rotation of the steering system 29. In this embodiment, the drive unit 70 is formed of the motor 70 described above, as an example. Assist of the drive unit 70 is for the steering torque of the handlebar 8 in at least a portion of the whole vehicle speed zone of the vehicle and increases as vehicle speed increases. Thus, steering assist in accordance with vehicle speed is enabled.

The motor 70 that is an example of the drive unit 70 outputs assist force that assists rotation of the steering system 29. Rotation of the output shaft 71 of the motor 70 is transmitted to the steering shaft 9 that is a portion of the steering system 29. Therefore, output of the motor 70 determines assist of steering. The output of the motor 70 can be determined in accordance with a state of the vehicle, including the steering torque and the vehicle speed. Assist by the motor 70 may be controlled in a range including positive-direction assist in which turning force in the same direction as that of the steering torque of the handlebar 8 is applied to the steering system 29, and negative-direction assist in which turning force in an opposite direction to that of the steering torque is applied to the steering system 29.

(Example of Structure of Steering Assist Device)

Figure 8:
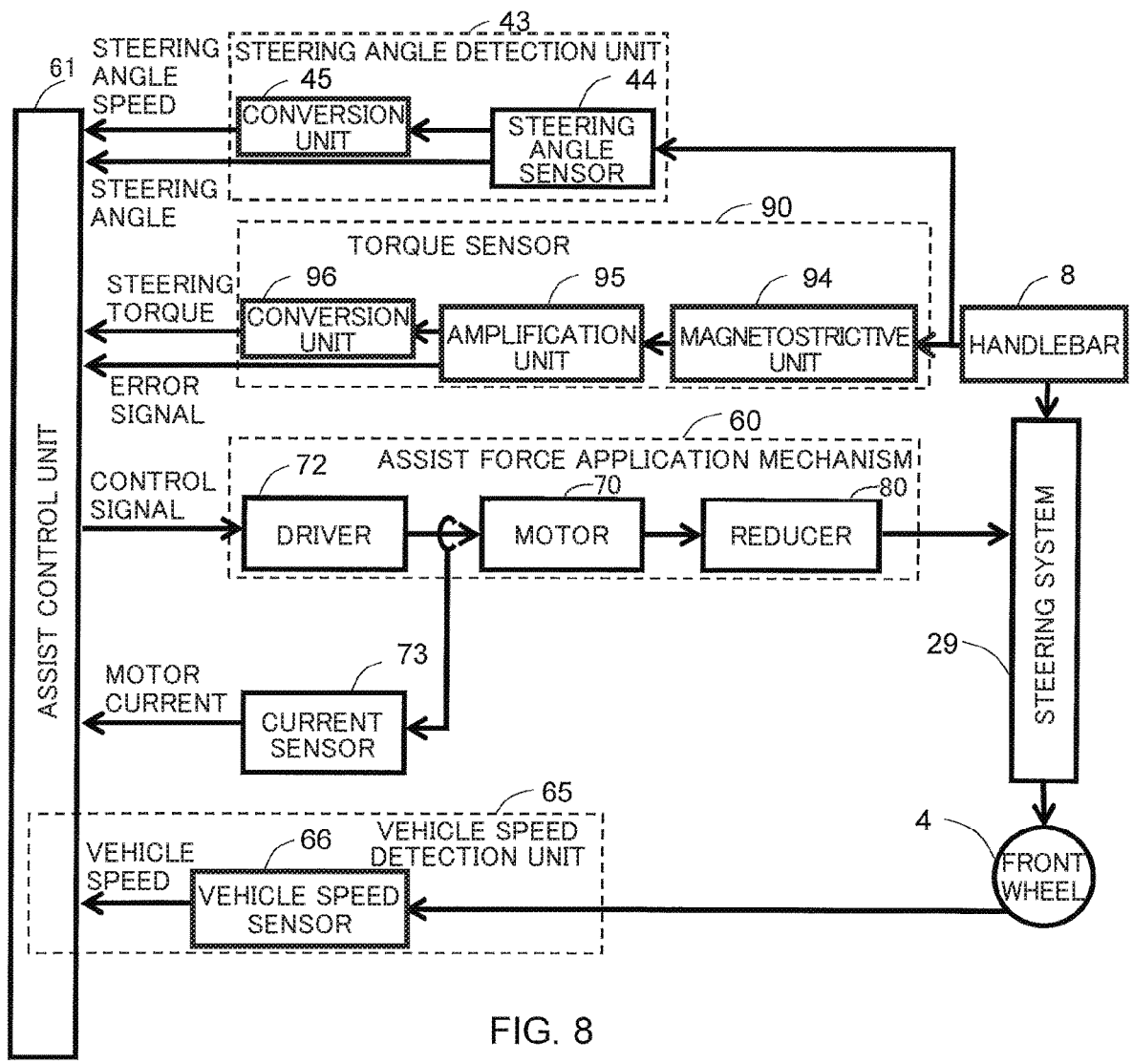
FIG. 8 is a functional block diagram illustrating an example of a structure of a motorcycle including a steering assist device.

FIG. 8 is a functional block diagram illustrating an example of a structure of the motorcycle 1 including the steering assist device 100. In FIG. 8, the steering assist device 100 includes an assist control unit 61 and an assist force application mechanism 60. That is, the assist force application mechanism 60 illustrated in FIG. 4 is a portion of the steering assist device.

The assist control unit 61 can be formed of a circuit and/or a processor that controls the motor 70. The assist control unit 61 can be provided, for example, on a substrate in the housing 85. Alternatively, an electronic control unit (ECU) mounted on the motorcycle 1 can be used as the assist control unit 61.

The steering assist device 100 can be configured to further include a torque sensor 90 and a vehicle speed sensor 66. An assist control unit 61 controls the motor 70, based on a steering torque that has been detected by the torque sensor 90 and vehicle speed that has been detected by the vehicle speed sensor 66.

Also, the motorcycle 1 may include a steering angle sensor 44. The steering angle sensor 44 detects a steering angle of the handlebar 8. The steering angle sensor 44 can be attached to the steering system 29 (for example, the steering shaft 9, the transmission member 20, the front fork, or the like) and can be used as a sensor that detects rotation of the steering system 29 for the vehicle body frame 2. The assist control unit 61 is able to take in a signal related to the steering angle that has been detected by the steering angle sensor 44.

The assist control unit 61 transmits a control signal to a driver 72 (a drive circuit) of the motor 70. Also, the assist control unit 61 is able to take in a signal that indicates the steering torque that has been detected by the torque sensor 90 and the signal related to the steering angle that has been detected by the steering angle sensor 44.

The assist control unit 61 is connected to a steering angle detection unit 43, the torque sensor 90, the vehicle speed sensor 66, and the driver 72 of the motor 70. The assist control unit 61 receives information of a steering angle and steering angle speed of the handlebar 8 from the steering angle detection unit 43. The assist control unit 61 receives information of the steering torque of the handlebar 8 from the torque sensor 90. The assist control unit 61 receives information of the vehicle speed of the motorcycle 1 from the vehicle speed sensor 66. The assist control unit 61 calculates a command value used for controlling output of the motor 70, based on the steering torque that has been detected by the torque sensor 90 and the vehicle speed that has been detected by the vehicle speed sensor 66. The assist control unit 61 outputs the calculated command value to the driver 72 of the motor 70.

The structure of the assist control unit 61 is not limited to the example illustrated in FIG. 8. For example, the assist control unit 61 is able to receive other data than the steering torque, the steering angle speed, and the vehicle speed. As an example, the assist control unit 61 is able to receive various types of command signals or the like, which have been input by an operation of the rider. Also, the assist control unit 61 may be connected to a display unit including an LED or a display and be configured to output information to the rider via the display device. Also, for example, reception of data from the steering angle detection unit 43 may be omitted.

<Steering Angle Sensor>

In the example illustrated in FIG. 8, the steering angle sensor 44 detects a rotation angle and a rotation direction of the steering system 29. The steering angle sensor 44 sends data in accordance with the rotation angle and the rotation direction that have been detected as data that indicates the steering angle of the handlebar 8 to the assist control unit 61. In this case, the data that indicates the steering angle of the handlebar 8 may be, for example, a value that indicates a rotation angle of the handlebar 8 and also may be a value that indicates the rotation angle of the steering shaft 9 or another one of the members that serve as the steering system 29 or a steering angle of the front wheel 4. The steering angle speed of the handlebar 8 is the degree of change in rotation of the handlebar 8. The steering angle speed can be obtained by detecting rotation of the handlebar 8 or a portion of the steering system 29.

The steering angle detection unit 43 includes a conversion unit 45 that converts the steering angle that has been detected by the steering angle sensor 44 to steering angle speed. The conversion unit 45 can be configured to, for example, include a differentiation circuit that differentiates the steering angle and calculates the steering angle speed. Note that the assist control unit 61 is able to calculate the steering angle speed using a value of the steering angle that has been received from the steering angle sensor 44. In this case, the steering angle detection unit 43 may be configured not to include the conversion unit 45.

<Torque Sensor>

The torque sensor 90 includes a magnetostrictive unit 94, an amplification unit 95, and a conversion unit 96. The torque sensor 90 detects a steering torque by detecting twist of the torque transmission unit 13 that transmits rotation of the first member (the handle holder 21) to the second member (the shaft member 12) as described above. Therefore, the torque transmission unit 13 includes the magnetostrictive unit 94. The magnetostrictive unit 94 includes a magnetic body. In the torque transmission unit 13, the magnetostrictive unit 94 is formed in a portion that is opposed to the pickup coil 91 in a radial direction of the shaft member 12. The conversion unit 96 and the amplification unit 95 are mounted, for example, on the above-described mounting substrate 92.

When the magnetostrictive unit 94 is distorted by a torque due to rotation of the handlebar 8, magnetic permeability of the magnetostrictive unit 94 changes. Due to change in magnetic permeability of the magnetostrictive unit 94, an induction voltage is generated in the pickup coil 91. The induction voltage is a value in accordance with a torque that is applied to the magnetostrictive unit 94. The voltage of the pickup coil 91 is amplified by the amplification unit 95. Also, the amplification unit 95 may be configured to convert the induction voltage to a PWM signal. The conversion unit 96 converts a signal amplified by the amplification unit 95 to a value that indicates the steering torque. The value that indicates the steering torque is sent to the assist control unit 61. If a fault has occurred in the amplification unit 95, an error signal is sent from the amplification unit 95 to the assist control unit 61.

As described above, the torque sensor 90 is used as a torque sensor at a magnetostrictive side, and thereby, transmission loss of steering force can be decreased, as compared to a torque sensor using a torsion bar. Also, it is possible to downsize the torque sensor 90.

<Assist Force Application Mechanism>

The assist force application mechanism 60 includes, in addition to the motor 70 and the reducer 80 described above, a driver 72 that drives the motor 70, based on a control signal of the assist control unit 61. The driver 72 includes, for example, a drive circuit, such as an inverter or the like, which applies an AC current to the motor 70. The driver 72 receives a current command value as a control signal from the assist control unit 61, generates a PWM signal in accordance with the current command value, and drives the inverter by the PWM signal. Note that a portion of an operation of the driver 72 described above may be executed by the assist control unit 61.

In the example illustrated in FIG. 8, the motorcycle 1 includes a current sensor 73 that detects a current of the motor 70. The assist control unit 61 is able to execute, for example, feedback control using a motor current that has been detected by the current sensor 73.

<Vehicle Speed Detection Unit 65>

For example, the vehicle speed sensor may be configured to detect rotation speed of a front wheel or a rear wheel and also may be configured to detect a rotation number of an output sprocket of an engine. Alternatively, the vehicle speed sensor may be formed of an engine rotation sensor that detects the rotation number of the engine or a gear position sensor that detects a gear position.

In this example, the vehicle speed sensor 66 detects rotation of the front wheel 4 and sends a pulse signal in accordance with the rotation of the front wheel 4 to the assist control unit 61. The assist control unit 61 calculates vehicle speed, based on the pulse signal that has been received from the vehicle speed sensor 66. Note that the vehicle speed sensor 66 may be configured to detect rotation of the rear wheel 5.

<Assist Control Unit 61>

The assist control unit 61 generates a control signal of the motor 70 in accordance with the steering torque and the vehicle speed and sends the control signal to the driver 72. Therefore, the assist control unit 61 can be configured to include an interface that acquires a steering torque and vehicle speed, a command value calculation unit that calculates a command value of control of the motor 70 using the steering torque and the vehicle speed, and an interface that outputs the command value. The assist control unit 61 calculates a command value that indicates rotation force and a rotation direction of the motor 70. For calculation of the command value, correspondence data that indicates correspondence of the steering torque, the vehicle speed, and the command value can be used.

There are a case in which the assist control unit 61 calculates a command value that indicates rotation in the same direction as that of the steering torque, that is, assist in the positive direction, and a case in which the assist control unit 61 calculates a command value that indicates rotation in an opposite direction to that of the steering torque, that is, assist in the negative direction. Whether the command value is a value that indicates assist in the positive direction or a value that indicates assist in the negative direction can be determined in accordance with a combination of values that indicate a state of the vehicle, such as steering angle speed, a steering torque, vehicle speed, or the like.

Thus, the motor 70 is able to switch between the rotation force in the same direction as that of the steering torque that has been input by the handlebar 8 and the rotation force in the opposite direction to that of the steering torque in accordance with the state of the vehicle, such as steering angle speed, a steering torque, vehicle speed, or the like, and apply the rotation force to the steering system 29. That is, the output of the motor 70 is controlled such that the assist in the positive direction and the assist in the negative direction are switched from one to another in accordance with the state of the vehicle by the assist control unit 61.

As described above, rotation of the motor 70 is controlled in a range including both of rotation in the same direction as that of the steering torque and rotation in the opposite direction to that of the steering torque. Thus, both of a function of power steering that increases steering force and a function of steering damper that attenuates rotation of the steering system 29 can be realized by the motor 70. Also, by employing control by the motor 70, promptly and smoothly executing switching between power steering and steering damper is enabled.

The assist control unit 61 controls the motor 70 such that, in a vehicle speed zone VB1 that is a portion of the whole vehicle speed zone, as vehicle speed increases, an assist amount in the positive direction for the steering torque of the handlebar 8 increases. The assist control unit 61 determines assist in accordance with the steering torque that has been input to the handlebar 8 and the vehicle speed when the steering torque was input. In the vehicle speed zone VB1, assist when a steering torque has been input is determined so as to increase as the vehicle speed increases.

This embodiment includes an aspect in which assist to a steering torque increases as vehicle speed increases. In this embodiment, the assist to the steering torque is a magnitude of assist of the drive unit (the motor 70) with respect to a magnitude of the steering torque. That is, the assist to the steering torque indicates the degree of assist to the steering torque. For example, if the steering torque that is to be input is the same, an assist torque when the vehicle speed is high is larger than an assist torque when the vehicle speed is low. That is, the degree of assist in accordance with the assist steering torque to the steering torque increases as the vehicle speed increases. Note that assist herein is assist in the same direction as that of the steering torque, that is, the positive direction.

The inventors noticed that there is a case in which the higher the vehicle speed is, the larger the force that is needed for operation of the handlebar 8 at the time of turning is. It is considered that this is due to increase in gyro effect of the steering wheel when the vehicle speed is high. That is, it is considered that the above-described case occurs because a gyro moment of the steering wheel when the vehicle body is caused to turn in a roll direction during travelling is reflected to the steering torque. If the vehicle speed is high, the gyro moment at the time of turning is large. If the gyro moment is large, the steering torque that is needed at the time of turning is large.

Therefore, as in this embodiment, in the vehicle speed zone VB1 that is a portion of the whole vehicle speed zone, the degree of assist to the steering torque can be caused to increase as the vehicle speed increases. Thus, it is possible to increase steering assist at the time of turning in accordance with increase in vehicle speed. Therefore, steering assist in accordance with vehicle speed is possible.

The assist control unit 61 is able to control the motor 70 such that, in the vehicle speed zone VB1, if the vehicle speed increases when the steering torque is larger than a first threshold Th1, an assist amount for the steering torque increases. That is, a structure in which assist when a steering torque that is larger than the first threshold Th1 is input is increased in accordance with increase in vehicle speed can be employed. Thus, for example, when the rider operates the handlebar 8 with a certain level of force, steering assist in accordance with the vehicle speed can be performed.

The first threshold Th1 described above can be a value of 40-60% (for example, 50%) of a steering torque (which will be hereinafter referred to as a steering torque at the time when the vehicle is stopped) which is required for changing a steering angle by operating a handlebar in a state in which the motorcycle 1 (the straddled vehicle) is stopped. The steering torque at the time when the vehicle is stopped can be also referred to as an operation torque at the time of stationary steering. The steering torque at the time when the vehicle is stopped is determined, for example, by a weight of the vehicle, a structure of a steering transmission mechanism, or the like. Assist in accordance with the vehicle speed is enabled by setting the first threshold Th1 to be about 50% of the steering torque at the time when the vehicle is stopped. In this case, an aspect in which the first threshold Th1 is set to 50% of the steering torque at the time when the vehicle is stopped is not limited to a case in which the first threshold Th1 strictly matches 50% of the steering torque at the time when the vehicle is stopped and includes a case in which there is a margin of error that can be considered to match. That is, the first threshold Th1 can be set to be substantially the same as 50% of the steering torque at the time when the vehicle is stopped. In this case, the steering torque at the time when the vehicle is stopped is a steering torque that is required for changing the steering angle in a state in which the straddled vehicle is stopped on a dry paved road surface.

The vehicle speed zone VB1 described above can be a range of vehicle speed, which has been determined in advance. The vehicle speed zone VB1 may be fixed and also may vary in accordance with a state of the vehicle. The vehicle speed zone VB1 is set in a portion of the whole vehicle speed zone. In this case, the whole vehicle speed zone is a range of possible vehicle speed of the motorcycle 1 (the straddled vehicle). The vehicle speed zone VB1 is determined, for example, in accordance with a vehicle characteristic or the like. In the vehicle speed zone VB1 that is a portion of the whole vehicle speed zone, steering assist in accordance with the vehicle speed is enabled by performing assist increase control along with increase in vehicle speed.

Figure 9:
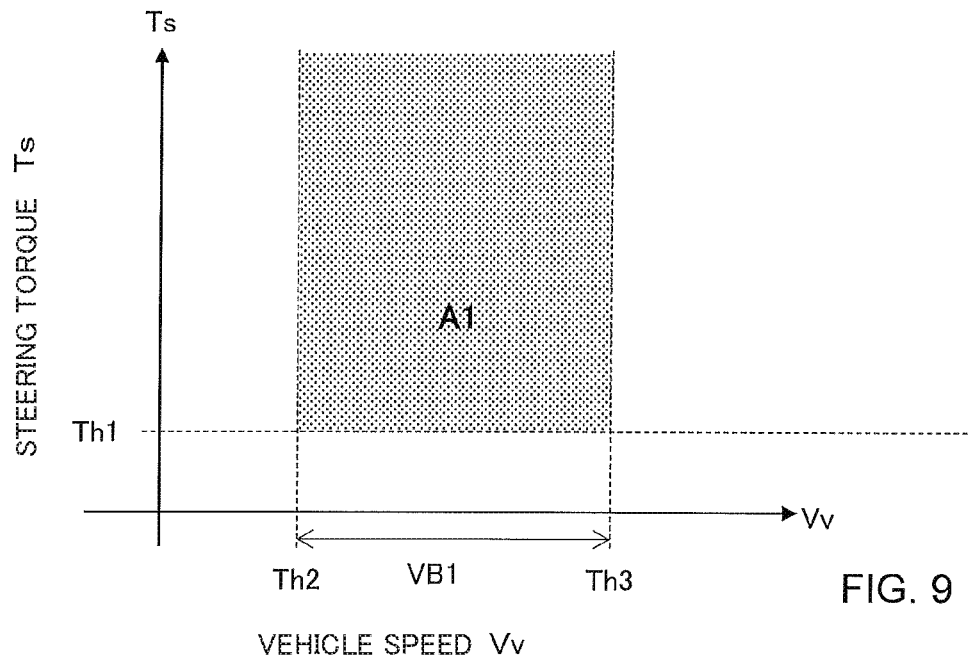
FIG. 9 is a graph illustrating an example of conditions of assist increase control along with increase in vehicle speed.

FIG. 9 is a graph illustrating an example of conditions of assist increase control along with increase in vehicle speed.

In the graph illustrated in FIG. 9, an ordinate indicates a steering torque Ts and an abscissa indicates vehicle speed Vv. In the example illustrated in FIG. 9, if the steering torque Ts is larger than the first threshold Th1 (Th1<Ts) and the vehicle speed Vv is between a second threshold Th2 and a third threshold Th3 (Th2<Vv<Th3), the motor 70 is controlled such that, as the vehicle speed increases, assist to the steering torque increases. That is, if the steering torque Ts and the vehicle speed Vv are included in a region A1 of the graph illustrated in FIG. 9, assist increase control along with increase in vehicle speed is performed. When the vehicle travels with Th2<Vv<Th3, the higher the vehicle speed Vv is, the larger assist to the steering torque of the first threshold Th1 or more becomes.

In the example illustrated in FIG. 9, each of the second threshold Th2 and the third threshold Th3 that determine an upper limit and a lower limit of the vehicle speed zone VB1 is larger than 0 (Th2 >0, Th3 >0). That is, the vehicle speed zone VB1 is a portion in a middle of the whole vehicle speed zone. In contrast, it is also possible to set the lower limit of the vehicle speed zone VB1 to 0 and the upper limit thereof to the second threshold Th2 or the third threshold Th3 (0<Vv<Th2 or 0<Vv<Th3). That is, the vehicle speed zone VB1 can be a portion including vehicle speed of 0 in the whole vehicle speed zone. Alternatively, the vehicle speed zone VB1 can be set to satisfy Th3<Vv. Also, in the whole vehicle speed zone, two or more zones that are separated from one another may be set as the vehicle speed zone VB1. How the vehicle speed zone VB1 is set can be determined by a type, a characteristic, or the like, of the motorcycle 1.

Note that, in the example illustrated in FIG. 9, the steering torque Ts is included in conditions for assist increase control along with increase in vehicle speed, but some other value may be included in the conditions. For example, a steering angle speed Vr may be included in the conditions. In this case, it is possible to cause, when the steering angle speed Vr is smaller than a fourth threshold Th4 (Th4 not shown in the drawings), assist to the steering torque to increase as the vehicle speed increases. That is, it is possible to cause, if the steering angle speed Vr has exceeded the fourth threshold Th4, the assist not to increase in accordance with increase in vehicle speed. Thus, rotation of the steering system 29 due to a rapid operation of the handlebar 8 by the rider can be suppressed. Also, rotation of the steering system 29 due to external disturbance, such as kickback or the like, can be suppressed. Note that, instead of the steering torque Ts, the steering angle speed Vr may be included in the above-described conditions and also both of the steering torque Ts and the steering angle speed Vr may be included in the above-described conditions.

The thresholds Th1 to Th4 described above are determined, for example, by data that has been recorded in the assist control unit 61 in advance. In this case, the assist control unit 61 includes a recording unit, such as a memory or the like, which records the thresholds Th1 to Th4.

The thresholds Th1 to Th4 may not be fixed values. For example, each of the thresholds Th1 to Th4 can be a value that is determined in accordance with a vehicle state, such as a steering torque, steering angle speed, vehicle speed, vehicle acceleration, or the like. As an example, the assist control unit 61 is able to determine the thresholds Th1 to Th4 in accordance with the state of the vehicle with reference to data that indicates correspondence between a value that indicates the state of the vehicle and the thresholds Th1 to Th4.

Operation Example

Figure 10:
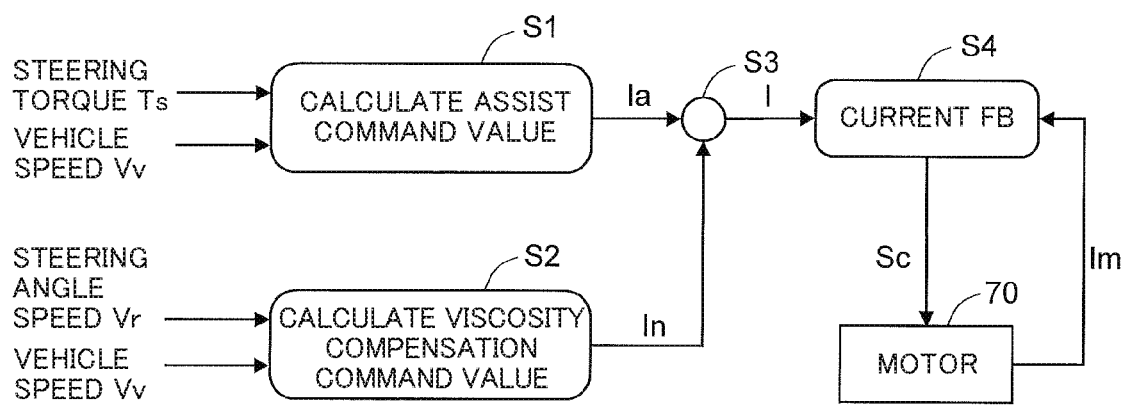
FIG. 10 is a diagram illustrating an example of a flow of processing of an assist control unit.

FIG. 10 is a diagram illustrating an example of a flow of processing of the assist control unit 61. In the example illustrated in FIG. 10, the assist control unit 61 calculates an assist command value Ia using the steering torque Ts that has been received from the torque sensor 90 and the vehicle speed Vv that has been received from the vehicle speed sensor 66 (Step S1). The assist command value Ia can be, for example, a value that is used for generating a torque in the same direction as that of a steering torque that is applied to the steering system 29 in the motor 70. In this case, as an example, the assist command value Ia is a current command value. The assist command value Ia that is used for generating a torque in the same direction as that of the steering torque is positive (Ia>0).

In Step S1, the assist control unit 61 refers to data that indicates a correspondence relation between the steering torque, the vehicle speed, and the assist command value and determines the assist command value Ia that corresponds to the steering torque Ts and the vehicle speed Vv that have been input. For example, the assist control unit 61 is able to determine the assist command value Ia that corresponds to the steering torque Ts and the vehicle speed Vv that have been input by map calculation using map data as the data that indicates the correspondence relation.

Figure 11:
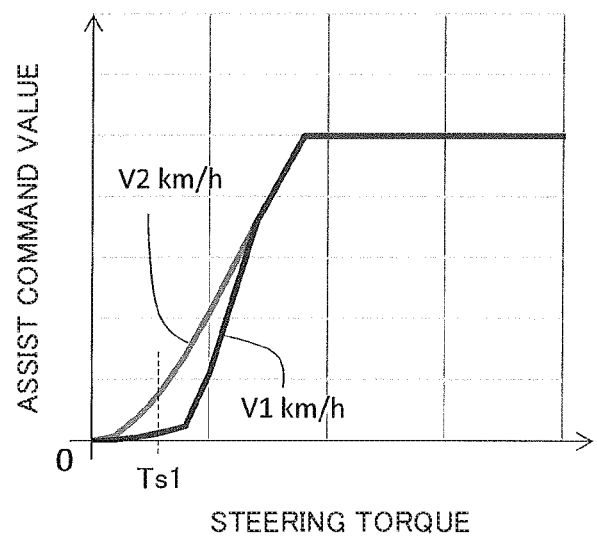
FIG. 11 is a graph illustrating an example of a correspondence relation between a steering torque and an assist command value.

FIG. 11 is a graph illustrating an example of the correspondence relation between the steering torque, the vehicle speed, and the assist command value. In the example illustrated in FIG. 11, a correspondence relation between the steering torque and the assist command value is set for a plurality of vehicle speeds. That is, the correspondence relationship between the steering torque and the assist command value is set so as to differ depending on the vehicle speed. In the correspondence relation illustrated in FIG. 11, a correspondence relation in which a positive assist command value increases as the steering torque increases is set. How the assist command value increases with respect to increase in steering torque differs depending on the vehicle speed. In FIG. 11, V1 and V2 are values of vehicle speeds, each of which is not 0. As an example, V1 and V2 are set to satisfy 0<V1<V2. Note that V1 and V2 may be vehicle speed zones.

The correspondence relation between the steering torque and the assist command value is not limited to the example illustrated in FIG. 11. The correspondence relation can be recorded, for example, as map data in the assist control unit 61, but a format of data, which indicates the correspondence relation, is not limited to map data. For example, data, such as a function or the like, which is used for calculating the corresponding assist command value, can be used as the data that indicates the correspondence relation using, in addition to data in a table format, values of the steering torque and the vehicle speed which have been given.

With reference to FIG. 10 again, the assist control unit 61 calculates a viscosity compensation command value In using the steering angle speed Vr and the vehicle speed Vv that have been received from the steering angle detection unit 43 (Step S2). The viscosity compensation command value In can be, for example, a value that is used for generating a torque in an opposite direction to that of the steering torque that is applied to the steering system 29 in the motor 70. In this case, as an example, the viscosity compensation command value In is a current command value. The assist command value Ia that is used for generating a torque in the opposite direction to that of the steering torque is negative (Ia<0).

In Step S2, the assist control unit 61 refers to data that indicates a correspondence relation between the steering angle speed, the vehicle speed, and the viscosity compensation command value and determines the viscosity compensation command value In that corresponds to the steering angle speed Vr and the vehicle speed Vv that have been input. For example, the assist control unit 61 is able to determine the viscosity compensation command value In that corresponds to a pair of the steering angle speed Vr and the vehicle speed Vv that have been input by map calculation using map data as the data that indicates the correspondence relation.

Figure 12:
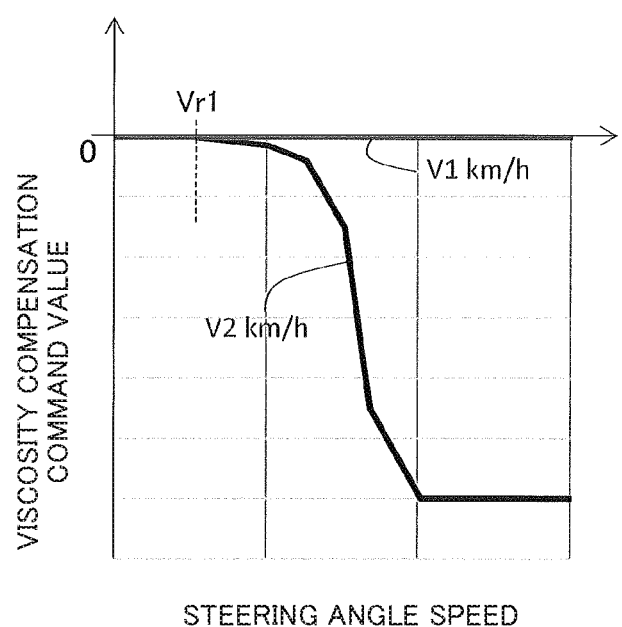
FIG. 12 is a graph illustrating an example of a correspondence relation between a steering angle speed and a viscosity compensation command value.

FIG. 12 is a graph illustrating an example of the correspondence relation between the steering angle speed, the vehicle speed, and the viscosity compensation command value, which is indicated by the map data. In the example illustrated in FIG. 12, the correspondence relation between the steering angle speed and the viscosity compensation command value is set for a plurality of vehicle speeds. That is, the correspondence relation between the steering angle speed and the viscosity compensation command value is set so as to differ depending on the vehicle speed. The correspondence relation illustrated in FIG. 12 includes a correspondence relation in which a negative viscosity compensation command value decreases as the steering angle speed increases. How the viscosity compensation command value changes with respect to increase in steering angle speed differs depending on the vehicle speed. When the vehicle speed Vv satisfies Vv=V1, the viscosity compensation command value does not depend on the steering angle speed and is constant (0). When the vehicle speed Vv satisfies Vv=V2, the negative viscosity compensation command value decreases as the steering angle speed increases and, when the steering angle speed is a predetermined value or more, the viscosity compensation command value is constant.

The correspondence relation between the steering angle speed and the viscosity compensation command value is not limited to the example illustrated in FIG. 12. The correspondence relation can be recorded, for example, as map data in the assist control unit 61, but a format of data, which indicates the correspondence relation, is not limited to map data. For example, data, such as a function or the like, which is used for calculating the corresponding viscosity compensation command value, can be used as the data that indicates the correspondence relation using, in addition to data in a table format, values of the steering angle speed and the vehicle speed which have been given.

With reference to FIG. 10 again, the assist control unit 61 adds the assist command value Ia that has been calculated in Step S1 and the viscosity compensation command value In that has been calculated in Step S2 (Step S3). A sum Ia+In of the assist command value Ia and the viscosity compensation command value In is calculated as an output command value I. That is, in this example, the assist control unit 61 determines the command value I that is output to the motor 70, based on the command value Ia that is determined in accordance with the steering torque Ts and the command value In that is determined in accordance with the steering angle speed Yr.

Note that, in the example of FIG. 10, processing of adding the assist command value Ia and the viscosity compensation command value In is performed, but it is possible to further add some other command value. As an example, a static friction compensation command value Is that indicates the degree of assist in the positive direction, which is determined in accordance with a derivative of the steering torque Ts, a dynamic friction compensation command value Id that indicates the degree of assist in the positive direction, which is determined in accordance with the steering angle speed, or the like, can be further added, in addition to the assist command value Ia and the viscosity compensation command value In. That is, in Step S3, the output command value I can be calculated in accordance with I=the assist command value Ia+the static friction compensation command value Is+the viscosity compensation command value In+the dynamic friction compensation command value Id.

The assist control unit 61 executes current feedback processing using a motor current Im that has been detected in the motor 70 and the output command value I (Step S4). For example, the assist control unit 61 is able to compare the motor current Im that has been detected in the motor 70 and the output command value I with one another, generate a control signal that decreases a difference therebetween, and output the control signal to the motor 70. Note that the feedback processing may be executed by the driver 72.

In this case, an example of an operation of the assist control unit 61 when each of the steering torque and the steering angle speed that are input is constant and the vehicle speed has changed will be described. For example, a case in which the steering torque Ts that is input is Ts=Ts1 and is constant and the steering angle speed Vr that is input satisfies Vr=Vr1 will be described.

In this case, a case in which the vehicle speed Vv that is input has increased from V1 to V2 and then V3 (V1<V2<V3) in a stepwise manner under a condition under which each of the steering torque Ts and the steering angle speed Vr that are input is substantially constant (Ts=Ts1, Vr=Vr1) will be described. In this case, the assist control unit 61 refers to, for example, the map data that indicates the correspondence relation illustrated in FIG. 11 and calculates each of assist command values Ia(1), Ia(2), and Ia(3) that correspond to Vv=V1, V2, V3.

The assist control unit 61 refers to, for example, the map data that indicates the correspondence relation illustrated in FIG. 12 and determines viscosity compensation command values In(1), In(2), and In(3) that correspond to Vr=Vr1 and Vv=V1, V2, V3. If the correspondence relation illustrated in FIG. 12 is used, each of In(1) and In(2) is 0.

The output command value I is a sum of the assist command value Ia and the viscosity compensation command value In. Therefore, as the output command value I, Ia(1)+Ib(1), Ia(2)+Ib(2), and Ia(3)+Ib(3) are calculated.

For example, in a vehicle speed zone of V1≤Vv≤V2, the output command value I that is calculated from the assist command values Ia(1), Ia(2), and Ia(3) and the viscosity compensation command values In(1), In(2), and In(3) increases as the vehicle speed Vv increases. Thus, when each of the steering torque and the steering angle speed that are input is constant, an output torque of the motor 70 increases as the vehicle speed Vv increases. As a result, a torque in the same direction as that of the steering torque that is applied to the steering system 29 from the motor 70 increases as the vehicle speed Vv increases. In an area in which the vehicle speed Vv is larger than V2, the output command value I is constant.

In this example, a vehicle speed zone (V1≤Vv≤V2) in which, in a state in which the steering torque Ts and the steering angle speed Vr satisfy a predetermined condition, when the vehicle speed Vv is caused to increase, the output command value I increases exists. In this vehicle speed zone, assist to the steering torque Ts increases as the vehicle speed Vv increases. Assist in accordance with the vehicle speed is enabled by the above-described assist. For example, even when the vehicle speed increases, the rider hardly feels that the load of the handlebar 8 at the time of turning is heavy.

Figure 13:
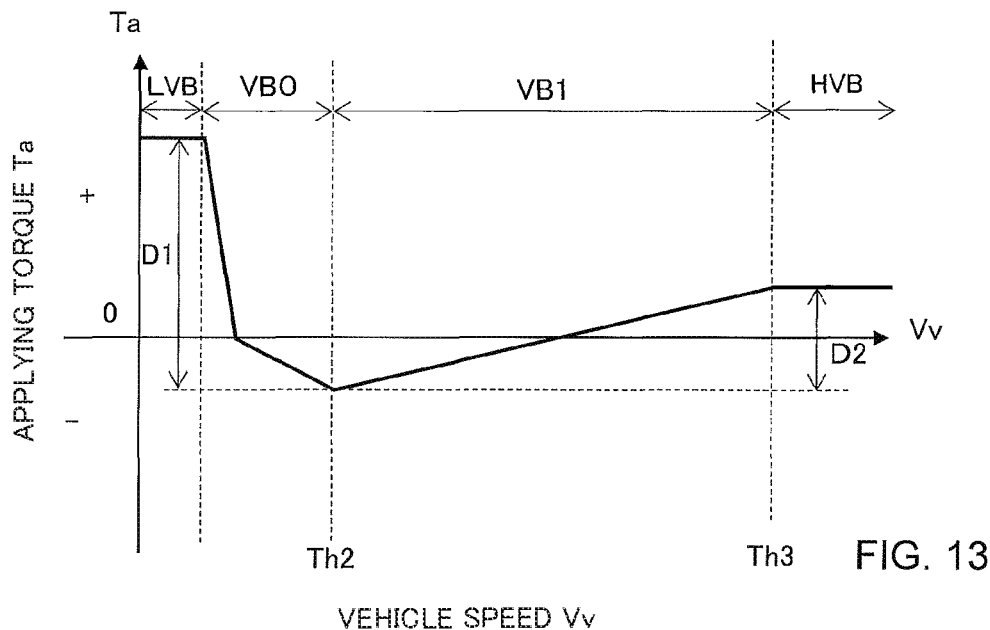
FIG. 13 is a graph illustrating a modified example of assist control.
Figure 14:
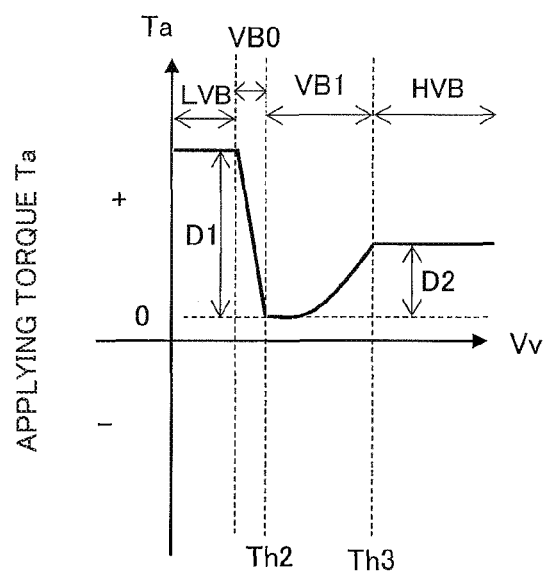
FIG. 14 is a graph illustrating a modified example of assist control.

FIG. 13 and FIG. 14 are graphs each illustrating an example of assist control. In each of the graphs illustrated in FIG. 13 and FIG. 14, an ordinate indicates a magnitude of a torque, that is, assist (assist force), which is applied to the steering system 29 by the motor 70 and an abscissa indicates vehicle speed. These graphs indicate transitions of a torque when the vehicle speed changes under a condition in which the steering torque Ts is constant and satisfies Ts>Th1.

In the example illustrated in FIG. 13, when the vehicle speed Vv is below the second threshold Th2, the assist direction is an opposite direction to that of the steering torque, that is, the negative direction. In the vehicle speed zone VB1, as the vehicle speed Vv increases, assist in the positive direction increases. Therefore, in the vehicle speed zone VB1, the assist direction has changed from the negative direction to the positive direction. When the vehicle speed Vv is above the third threshold Th3, the assist direction is the positive direction. As described above, the vehicle speed zone VB1 in which assist increases as the vehicle speed Vv increases may include a vehicle speed zone in which the assist direction is negative.

In the example illustrated in FIG. 13, in the vehicle speed zone VB0 that is lower than the vehicle speed zone VB1, assist in the positive direction decreases as the vehicle speed Vv increases. As described above, when the steering torque Ts is constant, the steering assist device 100 may cause assist to decrease as the vehicle speed Vv increases in the vehicle speed zone VB0 and cause the assist to increase as the vehicle speed Vv increases in the vehicle speed zone VB1 that is higher than the vehicle speed zone VB0. The vehicle speed zone VB0 is an example of the first vehicle speed zone. The vehicle speed zone VB1 is an example of a second vehicle speed zone.

In the example illustrated in FIG. 14, change in assist with respect to change in the vehicle speed Vv in the vehicle speed zone VB1 is not linear. As described above, a case in which the increase in the assist along with increase in the vehicle speed Vv is not linear is also included in an embodiment of the present teaching. Also, in the example illustrated in FIG. 14, when the steering torque Ts is constant, the steering assist device 100 causes the assist to decrease as the vehicle speed Vv increases in the vehicle speed zone VB0 and causes the assist to increase as the vehicle speed Vv increases in the vehicle speed zone VB1 that is higher than the vehicle speed zone VB0. The change in the assist with respect to the change in the vehicle speed Vv in the vehicle speed zone VB0 and the vehicle speed zone VB1 may be curved or stepwise, in addition to the case in which the change is linear.

In each of the examples of FIG. 13 and FIG. 14, a decrease amount D1 of assist that decreases as the vehicle speed Vv increases in the vehicle speed zone VB0 is larger than an increase amount D2 of the assist that increases as the vehicle speed Vv increases in the vehicle speed zone VB1. Also, a ratio of the decrease amount of the assist to a change amount of the vehicle speed in the vehicle speed zone VB0 is larger than a ratio of the increase amount of the assist to a change amount of the vehicle speed in the vehicle speed zone VB1.

In each of the examples of FIG. 13 and FIG. 14, in a lower vehicle speed zone that is lower than the vehicle speed zone VB0 in which the assist is caused to decrease as the vehicle speed Vv increases, there is a low-speed assist-force-constant vehicle speed zone LVB in which the assist is constant with respect to the change in the vehicle speed Vv. In a higher vehicle speed zone than the vehicle speed zone VB1 in which the assist is caused to increase as the vehicle speed Vv increases, there is a high-speed assist-force-constant vehicle speed zone HVB in which the assist is constant with respect to the change in the vehicle speed.

Figure 15:
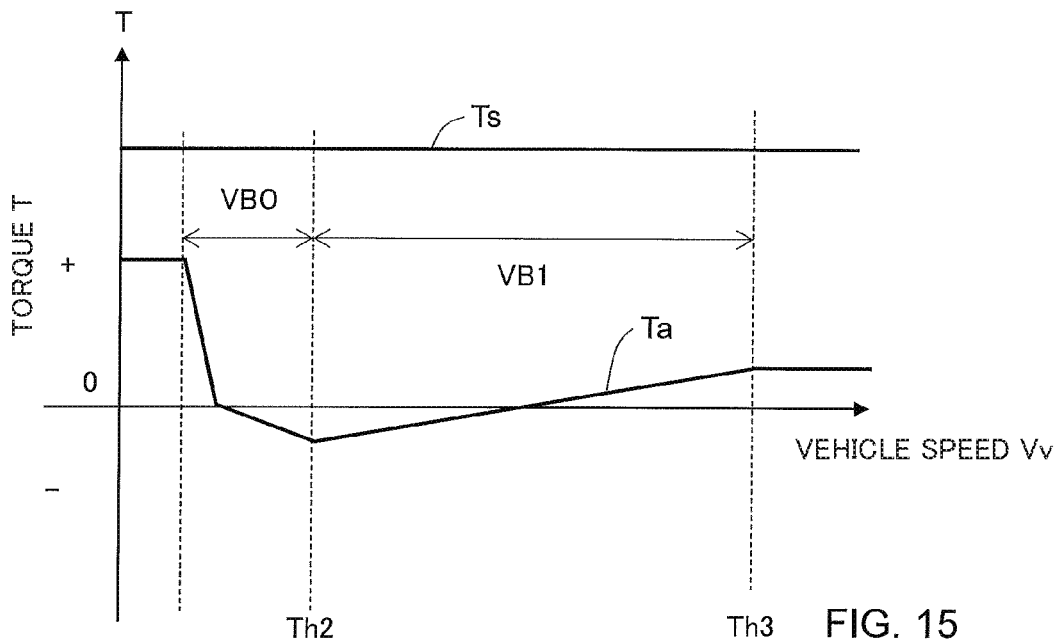
FIG. 15 is a graph illustrating an applying torque Ta and a steering torque Ts in FIG. 13.

Each of the graphs illustrated in FIG. 13 and FIG. 14 indicates an applying torque Ta when a steering torque that is input to a handlebar is constant. The applying torque Ta is a magnitude of a torque in the same direction as that of a steering torque that is applied to a steering shaft by the steering assist device 100. The applying torque Ta is a value that indicates the magnitude of an applying torque with respect to the steering torque that is input. For example, the applying torque Ta in FIG. 13 and the steering torque Ts that is input to the handlebar by the rider are as illustrated in a graph of FIG. 15.

Note that change in an applying torque depending on the vehicle speed, which is caused by the steering assist device 100, is not limited to the examples illustrated in FIG. 13 and FIG. 14. For example, an aspect in which at least one of the low-speed assist-force-constant vehicle speed zone LVB and the high-speed assist-force-constant vehicle speed zone HVB does not exist may be employed. In each of FIG. 13 and FIG. 14, a maximum value of the applying torque Ta with respect to the steering torque in the vehicle speed zone VB0 is larger than a maximum value of the applying torque Ta with respect to the steering torque in the vehicle speed zone VB1. In contrast, the maximum value of the applying torque Ta with respect to the steering torque in the vehicle speed zone VB0 may be the same as or smaller than the maximum value of the applying torque Ta with respect to the steering torque in the vehicle speed zone VB1. Also, in each of FIG. 13 and FIGS. 14, D1 and D2 is D1>D2 but may be D1≤D2. Also, a ratio of a decrease amount of the assist to a change amount of the vehicle speed in the vehicle speed zone VB0 may be the same as or smaller than a ratio of an increase amount of the assist to the change amount of the vehicle speed in the vehicle speed zone VB1. Also, in the whole vehicle speed zone, a plurality of pairs of a vehicle speed zone in which the assist is caused to decrease as the vehicle speed Vv increases and a vehicle speed zone in which the assist is caused to increase as the vehicle speed Vv increases may be included.

In each of the examples illustrated in FIG. 13 and FIG. 14, the vehicle speed zone VB0 and the vehicle speed zone VB1 are adjacent to one another. That is, an upper limit of the vehicle speed zone VB0 and a lower limit of the vehicle speed zone VB1 match. In a zone that is lower than vehicle speed that is a border of the vehicle speed zone VB0 and the vehicle speed zone VB1, the assist decreases as the vehicle speed Vv increases and, in a zone that is higher than vehicle speed that is the border of the vehicle speed zone VB0 and the vehicle speed zone VB1, the assist increases as the vehicle speed Vv increases. In contrast, there may be an intermediate assist-force-constant vehicle speed zone in which the assist is constant with respect to change in the vehicle speed between the vehicle speed zone VB0 and the vehicle speed zone VB1.

The aspect in which the steering assist device 100 causes the applying torque Ta to decrease or increase as the vehicle speed Vv increases is not limited to an aspect in which the steering assist device 100 causes the applying torque Ta to linearly change with respect to change in the vehicle speed Vv. The steering assist device 100 may be configured to, for example, change the applying torque Ta in a curved or stepwise manner with respect to change in the vehicle speed Vv.

FIG. 16 to FIG. 19 are graphs each illustrating another example of applying torque control by the steering assist device 100. These graphs indicate transitions of an applying torque that is applied to the steering shaft 9 by the steering assist device 100 when the vehicle speed has changed under a condition under which the steering torque Ts is constant and satisfies Ts>Th1.

Figure 16:
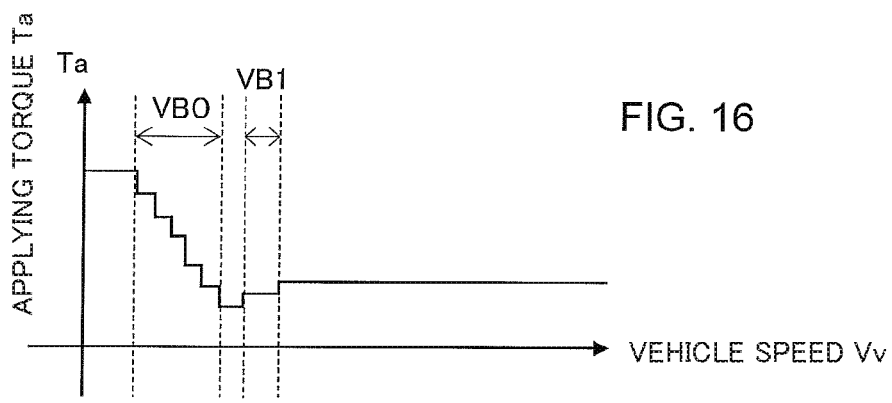
FIG. 16 is a graph illustrating another example of applying torque control by a steering assist device.

In the example illustrated in FIG. 16, in the vehicle speed zone VB0, the steering assist device 100 causes the applying torque Ta to decrease in a stepwise manner in a plurality of stages as the vehicle speed Vv increases. In the vehicle speed zone VB1, the steering assist device 100 causes the applying torque Ta to increase in a stepwise manner in a plurality of steps as the vehicle speed Vv increases. There is the intermediate assist-force-constant vehicle speed zone in which the applying torque Ta is constant with respect to change in the vehicle speed between the vehicle speed zone VB0 and the vehicle speed zone VB1.

Figure 17:
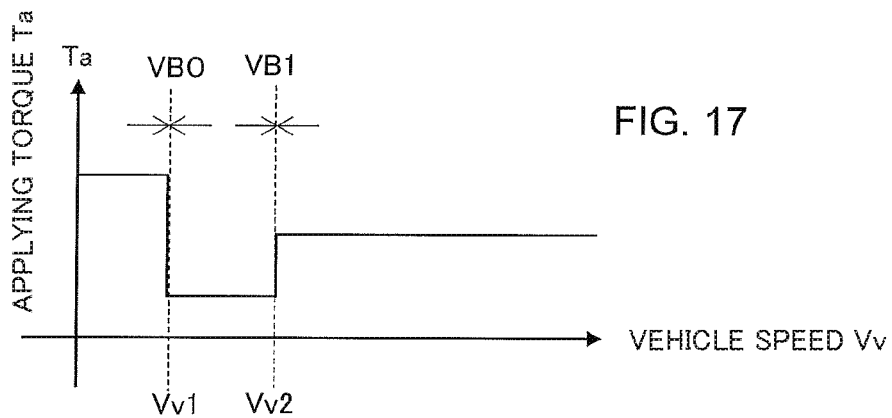
FIG. 17 is a graph illustrating another example of applying torque control by a steering assist device.

In the example illustrated in FIG. 17, the steering assist device 100 causes the applying torque Ta to decrease in one step at a vehicle speed Vv1. In this case, it is assumed that the vehicle speed Vv1 is the vehicle speed zone VB0. The steering assist device 100 causes the applying torque Ta to increase in one step at a vehicle speed Vv2. In this case, it is assumed that the vehicle speed Vv2 is the vehicle speed zone VB1.

Figure 18:
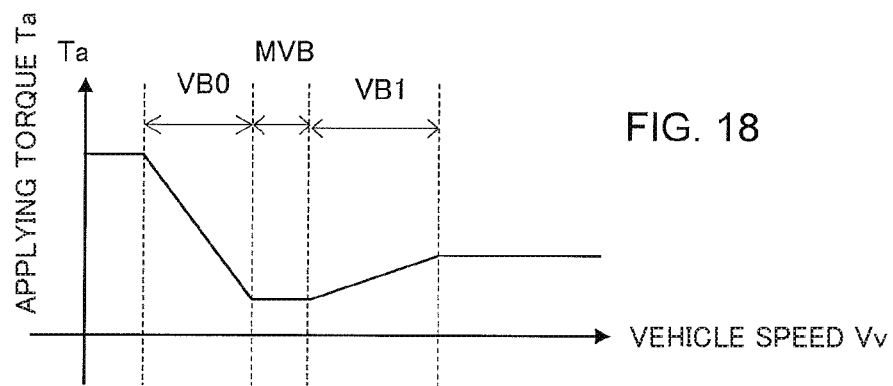
FIG. 18 is a graph illustrating another example of applying torque control by a steering assist device.

In the example illustrated in FIG. 18, the steering assist device 100 causes the applying torque Ta to linearly change with respect to change in the vehicle speed Vv in the vehicle speed zone VB0 and the vehicle speed zone VB1. Between the vehicle speed zone VB0 and the vehicle speed zone VB1, the steering assist device 100 does not cause the applying torque Ta to change with respect to change in the vehicle speed Vv. That is, between the vehicle speed zone VB0 and the vehicle speed zone VB1, there is the intermediate assist-force-constant vehicle speed zone MVB in which the applying torque Ta is constant with respect to change in the vehicle speed Vv. Note that the applying torque Ta may be caused to change in a curved or stepwise manner with respect to change in the vehicle speed Vv in at least one of the vehicle speed zone VB0 and the vehicle speed zone VB1.

Figure 19:
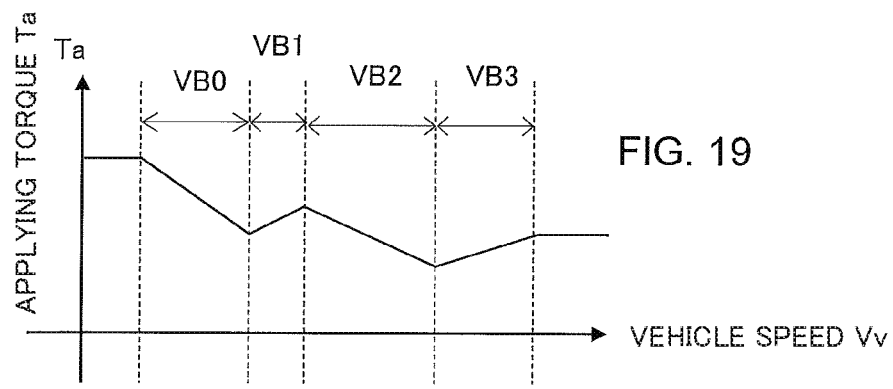
FIG. 19 is a graph illustrating another example of applying torque control by a steering assist device.

In the example illustrated in FIG. 19, in the whole vehicle speed zone, a plurality of pairs of a vehicle speed zone in which the assist is caused to decrease as the vehicle speed Vv increases and a vehicle speed zone in which the assist is caused to increase as the vehicle speed Vv increases is included. Specifically, the steering assist device 100 causes the applying torque Ta to decrease as the vehicle speed Vv increases in the vehicle speed zone VB0 and causes the applying torque Ta to increase as the vehicle speed Vv increases in the vehicle speed zone VB1 that is higher than the vehicle speed zone VB0. The steering assist device 100 causes the applying torque Ta to decrease as the vehicle speed Vv increases in a vehicle speed zone VB2 that is higher than the vehicle speed zone VB1 and causes the applying torque Ta to increase as the vehicle speed Vv increases in a vehicle speed zone VB3 that is higher than the vehicle speed zone VB2. In at least one vehicle speed zone of the vehicle speed zones VB0 to VB3, the applying torque Ta may be caused to change in a curved or stepwise manner with respect to change in the vehicle speed Vv. Also, in at least one of vehicle speed zones between the vehicle speed zone VB0 and the vehicle speed zone VB1, between the vehicle speed zone VB1 and the vehicle speed zone VB2, and between the vehicle speed zone VB2 and the vehicle speed zone VB3, there may be the intermediate assist-force-constant vehicle speed zone in which the applying torque Ta is constant with respect to the change in the vehicle speed Vv.

Modified Examples

An embodiment of a steering assist device has been described above, but an embodiment of a steering assist device according to the present teaching is not limited to the above-described examples.

For example, a structure of the assist force application mechanism 60 is not limited to the example illustrated in FIG. 4. A structure in which rotation of the motor 70 is transmitted to some other portion of the steering system 29 than the steering shaft 9 may be employed. For example, a structure in which the rotation of the motor 70 is transmitted to one of the top bridge 50, the bottom bridge 14, the left buffer 6, or the right buffer 7 may be employed.

In the above-described examples, the drive unit is the motor 70, but the drive unit may be some other actuator than the motor 70. For example, a hydraulic actuator may be used as the drive unit.

Also, in the example of FIG. 1, the steering system 29 includes the transmission member 20, the top bridge 50, the bottom bridge 14, the left buffer 6, the right buffer 7, and the steering shaft 9, but the steering system 29 is not limited to this example. The steering system 29 can be configured to have an arbitrary structure that is used for steering the steering wheel. For example, the transmission member 20 may be omitted. In this case, a structure in which the handlebar 8 is unrotatably connected to the steering shaft 9 can be employed. Also, the transmission member 20 and the top bridge 50 may be omitted. Also, a structure in which the buffer is not included in the steering system 29 can be also employed.

In the above-described examples, as the front wheel 4 that is a steering wheel, one front wheel 4 is provided, but the steering wheel may be a pair of wheels aligned in the left-right direction. In this case, the straddled vehicle can be configured to include a link mechanism that is provided between a pair of wheels and a vehicle body frame and includes an arm that is rotatably supported with respect to the vehicle body frame. The arm rotates with respect to the vehicle body frame, and thereby, a relative position in the up-down direction with respect to the vehicle body frame of the pair of wheels is changed. Thus, the vehicle body frame is tilted with respect to the vertical direction. In this structure, the arm of the link mechanism can be a portion of the steering system that transmits steering force of the handlebar to the pair of wheels.

Also, the operation of the assist control unit 61 is not limited to the above-described examples. For example, in Step S1 and Step S2, the command values Ia and In can be also calculated using function data as the data that indicates the correspondence relation, instead of using map data.

In the above-described embodiments, as processing of comparing a threshold and a detection value that indicates the state of the vehicle to one another, an example of determination (for example, Ts>Th1 or the like) which does not include a case in which the threshold and the detection value are the same is illustrated. If the above-described determination is a determination (for example, Ts≥Th1) which includes the threshold=the detection value, the technical significance is the same.

Also, the torque detection unit is not limited to the torque sensor 90 having the above-described structure. For example, the torque detection unit may be configured to have a structure in which an operation torque is calculated based on a current of the motor 70. Alternatively, the torque sensor 90 may be configured to have a structure in which a torque of a rotation axis of the steering shaft 9 or the reducer 80 is detected. Also, instead of the magnetostrictive torque sensor, a torque sensor of some other type may be used. As some other type, for example, a torsion bar type in which a twist of a torsion bar is detected, a type in which a torque is detected by a strain gage, or the like may be employed.

Also, in the above-described examples, a structure in which the torque sensor 90 is provided in a portion of the steering system 29 and change in a physical quantity based on deformation of an easily deformable portion (the torque transmission unit 13) which is deformed in accordance with a torque that is input to the steering system 29 is detected is employed. A structure of the easily deformable portion is not limited to the above-described examples. The easily deformable portion that is used for detecting a steering torque can be provided in an arbitrary position of the steering system 29. For example, the easily deformable portion may be provided between the steering shaft 9 and the head pipe 10 or in the handlebar 8.

An output of the torque sensor 90 can be used also for some arbitrary control other than assist of steering force. For example, the output of the torque sensor 90 can be used for traction control and/or control of an anti-lock brake system (ABS). Similarly, outputs of the steering angle sensor 44 and the vehicle speed sensor 66 can be also used for some other arbitrary control.

The steering angle detection unit 43 is not limited to a structure illustrated in FIG. 8. For example, the steering angle detection unit may be configured to have a structure in which the steering angle speed is calculated based on a current of the motor 70.

The handlebar includes a bar that extends in the left-right direction of the straddled vehicle and is fixed to the steering shaft. As the bar of the handlebar, one bar may be used, and also, two bars, that is, left and right bars, which are connected to one another, may be used. For example, the left and right bars of the handlebar may be formed of independent parts. That is, the handlebar may be separate handles. A left grip is provided at a left end of the bar of the handlebar. A right grip is provided at a right end of the bar of the handlebar.

A range in which the handlebar can swing is 180 degrees (½ rotation) or less. This range in which the handlebar can swing is a difference (lock to lock) between a steering angle when the handlebar is maximally operated to the left and a steering angle when the handlebar is maximally operated to the right.

The steering shaft swings around an axis, that is, a swinging axis, which extends in the up-down direction of the vehicle body frame. In this case, a form in which the swinging axis of the steering shaft extends in the up-down direction of the vehicle body frame includes a case in which the swinging axis is tilted with respect to the up-down direction of the vehicle body frame. In this case, a tilt with respect to the up-down direction of the vehicle body frame in a direction in which the swinging axis extends is smaller than a tilt with respect to the left-right direction and the front-rear direction of the vehicle body frame.

The direction in which the swinging axis of the handlebar extends and the direction in which the swinging axis of the steering shaft extends may be the same and also may be different.

Also, a form in which the steering assist device applies assist force to the steering shaft includes a form in which power of a drive source, such as a motor or the like, is transmitted to the steering shaft via the transmission member, such as a reducer or the like as in the above-described examples. Also, the steering assist device may be configured to apply assist force, for example, by transmitting the power of the drive source to the steering shaft via some other member, such as a buffer device, a front fork, a link mechanism, or the like.

In the whole vehicle speed zone of the straddled vehicle, the first vehicle speed zone in which the assist force that is applied by the steering assist device decreases as the speed of the vehicle increases and the second vehicle speed zone in which the assist force that is applied by the steering assist device increases as the speed of the vehicle increases exist. The first vehicle speed zone is a lower vehicle speed zone than the second vehicle speed zone.

When the steering torque that has been input to the handlebar by the rider regardless of the steering angle speed of the handlebar is constant, the steering assist device is able to cause the assist force to decrease as the vehicle speed increases in the first vehicle speed zone and cause the assist force to increase as the vehicle speed increases in the second vehicle speed zone that is higher than the first vehicle speed zone. Alternatively, the steering assist device may be configured to, when each of the steering torque that has been input to the handlebar by the rider and the steering angle speed is constant, cause the assist force to decrease as the vehicle speed increases in the first vehicle speed zone and cause the assist force to increase as the vehicle speed increases in the second vehicle speed zone. Alternatively, the steering assist device may be configured to, when the steering torque that has been input to the handlebar by the rider is constant and also the steering angle speed is larger than a predetermined value, cause the assist force to decrease as the vehicle speed increases in the first vehicle speed zone and cause the assist force to increase as the vehicle speed increases in the second vehicle speed zone.

The steering assist device may be configured to include a torque detection unit that detects a steering torque of the handlebar and a vehicle speed sensor that detects vehicle speed. The steering assist device may be configured to control the drive unit, based on the steering torque that has been detected by the torque detection unit and the vehicle speed that has been detected by the vehicle speed sensor and apply assist force in the same direction as that of the steering torque to the steering shaft. The torque detection unit is not limited to the torque sensor of the above-described examples and can include a sensor that detects a physical quantity related to the steering torque that has been input to the handlebar by the rider. The physical quantity related to the steering torque can be, for example, the steering torque, change with time of the steering torque, that is, a derivative of the steering torque, a second order derivative of the steering torque, or the like. The steering assist device controls assist force that is applied to the steering shaft, based on an output signal of the sensor of the torque detection unit and an output signal of the vehicle speed sensor.

Note that a form in which the rider inputs the steering torque includes a case in which the rider holds down the handlebar against rotation of the steering wheel due to a disturbance such that the handlebar does not move.

When the steering torque that has been input to the handlebar by the rider is constant, the steering assist device causes the assist force to decrease as the vehicle speed increases in the first vehicle speed zone. Thus, assist force in the same direction as that of the steering torque that is applied to the steering shaft by the steering assist device when a vehicle speed Vv11 is maintained in the first vehicle speed zone and a steering torque Ts11 is input to the handlebar is larger than assist force when a higher vehicle speed Vv12 than the vehicle speed Vv11 (Vv11<Vv12) is maintained in the first vehicle speed zone and the steering torque Ts11 of the same magnitude is input to the handlebar. When the steering torque that has been input to the handlebar by the rider is constant, the steering assist device causes the assist force to increase as the vehicle speed increases in the second vehicle speed zone. Thus, assist force in the same direction as that of the steering torque that is applied to the steering shaft by the steering assist device when vehicle speed Vv21 (Vv12<Vv21) is maintained in the second vehicle speed zone and a steering torque Ts22 is input to the handlebar is smaller than assist force when higher vehicle speed Vv22 than the vehicle speed Vv21 (Vv21<Vv22) is maintained in the second vehicle speed zone and the same steering torque Ts22 is input to the handlebar.

When the steering torque is constant, a maximum value of the assist force that is applied to the steering shaft by the steering assist device in the first vehicle speed zone may be larger than a maximum value of the assist force in the second vehicle speed zone. Alternatively, when the steering torque is constant, the maximum value of the assist force that is applied to the steering shaft by the steering assist device in the first vehicle speed zone may be the same as or smaller than the maximum value of the assist force in the second vehicle speed zone.

Also, a decrease amount of the assist force that is caused to decrease as the vehicle speed increases in the first vehicle speed zone by the steering assist device may be smaller than an increase amount of the assist force that is caused to increase as the vehicle speed increases in the second vehicle speed zone by the steering assist device. Also, a ratio of the decrease amount of the assist force to a change amount of the vehicle speed in the first vehicle speed zone may be smaller than a ratio of the increase amount of the assist force to a change amount of the vehicle speed in the second vehicle speed zone. Also, in the whole vehicle speed zone, a plurality of pairs of the first vehicle speed zone in which the assist force is caused to decrease as the vehicle speed increases and the second vehicle speed zone in which the assist force is caused to increase as the vehicle speed increases may be included.

The steering assist device may be configured to cause the assist force to increase as the vehicle speed increases in a lower vehicle speed zone than the first vehicle speed zone. For example, assist force to a steering torque in a very low speed zone (a zone in which the vehicle speed is close to 0) may be set to a smaller value than a maximum value in the whole vehicle speed zone.

In the present teaching, as for positive and negative (plus and minus) of assist force, the same direction as that of a steering torque is positive (plus) and an opposite direction to that of the steering torque is negative (minus). Increase in the assist force means change in the assist force in the positive direction. Decrease in the assist force means change in the assist force in the negative direction. In the description, the assist force that is caused to increase or decrease as the vehicle speed changes by the steering assist device has been described herein as assist force in the same direction as that of the steering torque. The steering assist device may be configured to apply the assist force in the opposite direction to that of the steering torque to the steering shaft.

The vehicle body frame is a member that receives a stress that is applied to a leaning vehicle during travelling. For example, a monocoque (a stressed skin construction), a semi-monocoque, or a structure in which a vehicle part serves also as a member that receives a stress, are included in examples of the vehicle body frame. For example, there may be a case in which a part, such as an engine, an air cleaner, or the like, is a portion of the vehicle body frame.

The steering shaft and the steering wheel may be connected to one another via some other transmission member, such as the buffer device, the front fork, the link mechanism, or the like. Also, the steering shaft and the handlebar may be connected to one another via some other transmission member.

The present teaching can be applied to an arbitrary straddled vehicle other than the motorcycle 1. For example, the present teaching can be applied to a motor tricycle, an ATV, a snowmobile, a bicycle, or the like. For example, as the steering wheel, two wheels aligned in the left-right direction of the straddled vehicle may be provided. Note that the straddled vehicle means vehicles in general on which an occupant rides in a state in which the occupants bestrides a saddle.

Some of illustrated embodiments of the present teaching are described herein. The present teaching is not limited to various types of preferred embodiments described herein. The present teaching includes every embodiment including an equivalent element, correction, deletion, a combination (for example, a combination of features across various embodiments), improvement, and/or changes which can be recognized by a person skilled in the art, based on the present disclosure. Limitations of the claims should be broadly interpreted based on terms used in the claims and should not limited to the embodiments described herein or during prosecution of the present application. Such embodiments should be interpreted to be non-exclusive.

What is claimed is:

1. A straddled vehicle, comprising:
   a vehicle body frame configured to be tiltable in a left-right direction of the straddled vehicle;
   a steering shaft swingably supported by the vehicle body frame around an axis that extends in an up-down direction of the vehicle body frame;
   a handlebar that includes a left grip located at a left of a center of the straddled vehicle in the left-right direction thereof and a right grip located at a right of the center of the straddled vehicle in the left-right direction thereof and is connected to the steering shaft;
   a steering wheel connected to the steering shaft, rotation of the handlebar being transmittable to the steering wheel via the steering shaft, to thereby allow the straddled vehicle to turn left or right by tilting the vehicle body frame in the left-right direction of the straddled vehicle; and
   a steering assist device that applies assist force in a same direction as that of a steering torque that has been input to the handlebar by a rider to the steering shaft,
   wherein the steering shaft is integrally rotatable together with the steering wheel around a steering axial line that extends in the up-down direction in accordance with the rotation of the handlebar, and
   wherein, when the steering torque that has been input to the handlebar by the rider is constant, the steering assist device causes the assist force to decrease as a speed of the vehicle increases in a first vehicle speed zone and causes the assist force to increase as the speed of the vehicle increases in a second vehicle speed zone that is higher than the first vehicle speed zone.

2. The straddled vehicle according to claim 1, wherein a decrease amount of the assist force that is caused by the steering assist device to decrease as the speed of the vehicle increases in the first vehicle speed zone is larger than an increase amount of the assist force that is caused by the steering assist device to increase as the speed of the vehicle increases in the second vehicle speed zone.

3. The straddled vehicle according to claim 1, wherein a ratio of a decrease amount of the assist force to a change amount of the speed of the vehicle in the first vehicle speed zone is larger than a ratio of an increase amount of the assist force to a change amount of the speed of the vehicle in the second vehicle speed zone.

4. The straddled vehicle according to claim 1, wherein in a low-speed assist-force-constant vehicle speed zone in a lower vehicle speed zone than the first vehicle speed zone, the assist force is constant with respect to change in the speed of the vehicle.

5. The straddled vehicle according to claim 1, wherein in a high-speed assist-force-constant vehicle speed zone in a higher vehicle speed zone than the second vehicle speed zone, the assist force is constant with respect to change in the speed of the vehicle.

6. The straddled vehicle according to claim 1, wherein the first vehicle speed zone and the second vehicle speed zone are adjacent.

7. The straddled vehicle according to claim 1, wherein in an intermediate assist-force-constant vehicle speed zone between the first vehicle speed zone and the second vehicle speed zone, the assist force is constant with respect to change in the speed of the vehicle.

8. The straddled vehicle according to claim 1, wherein, when a steering torque that has been input to the handlebar by the rider is larger than a first threshold and is constant, the steering assist device causes the assist force to decrease as the speed of the vehicle increases in the first vehicle speed zone and the assist force to increase as the speed of the vehicle increases in the second vehicle speed zone.

* * * * *